(12) United States Patent
Li et al.

(10) Patent No.: US 12,302,282 B2
(45) Date of Patent: May 13, 2025

(54) EVENT-BASED PAGING, EVENT-BASED NOTIFICATIONS AND PAGING RESOURCE COORDINATION

(71) Applicants: Qiaoyu Li, Beijing (CN); Jing Lei, San Diego, CA (US); Chao Wei, Beijing (CN)

(72) Inventors: Qiaoyu Li, Beijing (CN); Jing Lei, San Diego, CA (US); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 631 days.

(21) Appl. No.: 17/632,778

(22) PCT Filed: Sep. 13, 2019

(86) PCT No.: PCT/CN2019/105819
§ 371 (c)(1),
(2) Date: Feb. 3, 2022

(87) PCT Pub. No.: WO2021/046837
PCT Pub. Date: Mar. 18, 2021

(65) Prior Publication Data
US 2022/0279477 A1    Sep. 1, 2022

(51) Int. Cl.
*H04W 68/00* (2009.01)
*H04W 56/00* (2009.01)
(Continued)

(52) U.S. Cl.
CPC ....... *H04W 68/005* (2013.01); *H04W 56/001* (2013.01); *H04W 74/002* (2013.01); *H04W 74/0841* (2013.01)

(58) Field of Classification Search
CPC ............. H04W 68/005; H04W 56/001; H04W 74/002; H04W 74/0841; H04W 74/004; H04W 88/04; H04W 68/00
See application file for complete search history.

(56) References Cited

U.S. PATENT DOCUMENTS 8,520,698 B2    8/2013  Kitazoe
8,818,427 B1    8/2014  Goyal et al.
(Continued)

FOREIGN PATENT DOCUMENTS

CN    201515498 U    6/2010
CN    104540223 A    4/2015
(Continued)

OTHER PUBLICATIONS

International Search Report and Written Opinion—PCT/CN2019/105819—ISA/EPO—Jun. 17, 2020.
(Continued)

*Primary Examiner* — Afshawn M Towfighi
(74) *Attorney, Agent, or Firm* — QUALCOMM Incorporated

(57) ABSTRACT

In an embodiment, a node (e.g., a UE, BS or relay node) transmits a paging message including at least one reference value associated with an event. At least one UE responds to the paging message (e.g., based on the presence of the at least one reference value in the paging message) with a response including UE-identifying information and the at least one reference value associated with the event. In an example where the node is a relay node, the relay node may coordinate with a BS so as to obtain an allocation of paging resources for transmission of the paging message. In a further embodiment, a UE may transmit, to a BS, at least one Message-A comprised by a PUSCH of a 2-Step RACH
(Continued)

procedure, wherein the Message-A includes the at least one reference value associated with the event.

34 Claims, 15 Drawing Sheets

(51) Int. Cl.
*H04W 74/00* (2009.01)
*H04W 74/0833* (2024.01)

(56) References Cited

U.S. PATENT DOCUMENTS

| | | | |
|---|---|---|---|
| 8,914,048 | B2 | 12/2014 | Montojo et al. |
| 10,455,547 | B2 | 10/2019 | Islam et al. |
| 10,517,067 | B2 | 12/2019 | Islam et al. |
| 2004/0157626 | A1 | 8/2004 | Park et al. |
| 2014/0099881 | A1 | 4/2014 | Boudreau et al. |
| 2018/0288734 | A1 | 10/2018 | Islam et al. |
| 2019/0387498 | A1* | 12/2019 | Li .................... H04W 40/12 |
| 2020/0100297 | A1* | 3/2020 | Agiwal ............ H04W 52/365 |
| 2020/0146069 | A1* | 5/2020 | Chen ................. H04W 76/18 |
| 2020/0229244 | A1* | 7/2020 | Yan .................. H04W 74/08 |
| 2020/0245373 | A1* | 7/2020 | Xiong ............. H04L 27/2613 |
| 2020/0245407 | A1* | 7/2020 | Shan ................ H04W 68/02 |
| 2020/0252896 | A1* | 8/2020 | Lei ................ H04W 74/0833 |
| 2021/0105851 | A1* | 4/2021 | Kim .............. H04W 74/0833 |
| 2023/0319780 | A1* | 10/2023 | Choi .............. H04W 68/025 |
| | | | 455/458 |

FOREIGN PATENT DOCUMENTS

| | | |
|---|---|---|
| CN | 105191166 A | 12/2015 |
| CN | 108449721 A | 8/2018 |
| CN | 108886738 A | 11/2018 |
| CN | 110062391 A | 7/2019 |
| WO | 2004073324 A2 | 8/2004 |
| WO | 2007127945 | 11/2007 |
| WO | 2009032818 | 3/2009 |
| WO | 2016123435 | 8/2016 |
| WO | 2016201804 A1 | 12/2016 |
| WO | 2018128884 | 7/2018 |
| WO | 2019139990 A1 | 7/2019 |
| WO | 2019194897 A1 | 10/2019 |

OTHER PUBLICATIONS

Huawei, et al., "Further Discussion on the Paging Receiving via Relay UE", 3GPP TSG-RAN WG2 Meeting #98, R2-1705302, 3rd Generation Partnership Project (3GPP), Mobile Competence Centre, 650, Route Des Lucioles, F-06921 Sophia-Antipolis Cedex, France, vol. RAN WG2, No. Hangzhou, China, May 15, 2017-May 19, 2017, May 14, 2017, 5 Pages, XP051275747, p. 4.
Supplementary European Search Report—EP19945062—Search Authority—Berlin—Sep. 21, 2023.
Supplementary Partial European Search Report—EP19945062—Search Authority—Berlin—May 9, 2023.

* cited by examiner

EVENT-BASED PAGING, EVENT-BASED NOTIFICATIONS AND PAGING RESOURCE COORDINATION

CROSS-REFERENCE TO RELATED APPLICATIONS

The present application for patent claims priority to International Patent Application No. PCT/CN2019/105819, entitled "EVENT-BASED PAGING, EVENT-BASED NOTIFICATIONS AND PAGING RESOURCE COORDINATION," filed Sep. 13, 2019, which is assigned to the assignee hereof and expressly incorporated herein by reference in its entirety.

BACKGROUND OF THE DISCLOSURE

1. Field of the Disclosure

Aspects of the disclosure relate generally to wireless communications and to techniques and apparatuses for event-based paging, event-based notifications and paging resource coordination.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile access (GSM) variation of TDMA, etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

It may be beneficial in some scenarios to ping UEs in a target geographical area for identification of users in the target geographical area. For example, a criminal engaged in a crime caught on camera may hide her/her face with a mask, such that the criminal is not identifiable based on video footage. Even in scenarios where a criminal is not masked and his/her face can be clearly seen in the video footage, identification of the criminal may still be difficult (e.g., facial recognition software may fail to map a detected face in the video footage to a user identity). However, it is common for criminals engaged in crimes to carry UEs (e.g., cell phones) which are often left on during the crimes. Embodiments of the disclosure are thereby directed in part to a paging scheme whereby paging message(s) are transmitted by a node (e.g., UE, BS, or relay node, such as a video camera) to solicit paging message response(s) from UE(s) in a particular geographic area (e.g., in proximity to a detected event, such as a crime).

In an aspect of the disclosure, a method, a computer-readable medium, and an apparatus are provided. The apparatus may be a node, such as a UE, BS, or relay node. The node may transmit a paging message including at least one reference value associated with an event. The node may further receive a set of responses to the paging message from a set of UEs including at least one UE, each response comprising UE-identifying information and the at least one reference value associated with the event.

In an aspect of the disclosure, a method, a computer-readable medium, and an apparatus are provided. The apparatus may be a UE. The UE may receive, from a node, a paging message including at least one reference value associated with an event. The UE may further determine to respond to the paging message based at least in part upon the presence at least one reference value within the paging message. The UE may further transmit a response to the paging message, the response comprising UE-identifying information and the at least one reference value.

In an aspect of the disclosure, a method, a computer-readable medium, and an apparatus are provided. The apparatus may be a UE. The UE may determine at least one reference value associated with an event. The UE may further transmit, from the UE to a base station, at least one Message-A comprised by a Physical Uplink Shared Channel (PUSCH) of a 2-Step Random Access Channel (RACH) procedure, wherein the Message-A includes the at least one reference value associated with the event In an aspect of the disclosure, a method, a computer-readable medium, and an apparatus are provided. The apparatus may be a base station. The base station may receive, from a user equipment (UE), at least one Message-A comprised by a Physical Uplink Shared Channel (PUSCH) of a 2-Step Random Access Channel (RACH) procedure, wherein the Message-A includes the at least one reference value associated with an event. The base station may further perform at least one action related to the event based on the at least one reference value.

In an aspect of the disclosure, a method, a computer-readable medium, and an apparatus are provided. The apparatus may be a base station. The base station may receive, from a relay node, a request for paging resources. The base station may further determine an allocation of a set of paging resources including at least one paging resource to the relay node in response to the request. The base station may further transmit an indication of the allocated set of paging resources to the relay node. The base station may further be precluded from transmission of any paging messages on the allocated set of paging resources.

Aspects generally include a method, apparatus, system, computer program product, non-transitory computer-readable medium, user equipment, cIoT user equipment, base station, wireless communication device, and/or processing system as substantially described with reference to and as illustrated by the drawings, specification, and appendix.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
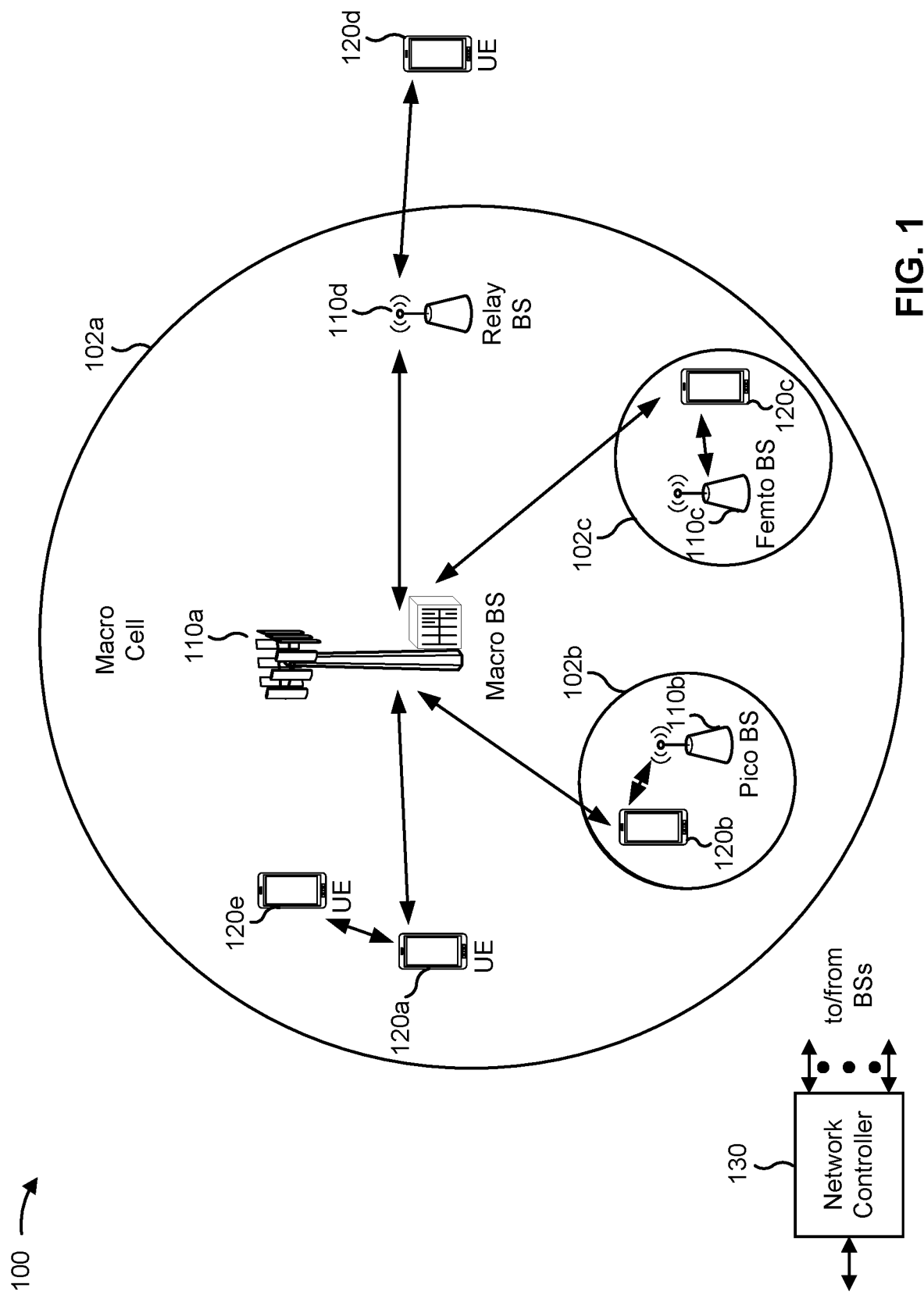
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. "MTC" may refer to MTC or eMTC. MTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. IoT UEs, eMTC UEs, coverage enhancement (CE) mode UEs, bandwidth-limited (BL) UEs, and other types of UEs that operate using diminished power consumption relative to a baseline UE may be referred to herein as cellular IoT (cIoT) UEs. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Access to the air interface may be controlled, for example, using a unified access control (UAC) system in which UEs are associated with an access identity (e.g., an access class and/or the like), which may aim to ensure that certain high-priority UEs (e.g., emergency response UEs, mission critical UEs, and/or the like) can access the air interface even in congested conditions. Updates to the UAC parameters (e.g., priority levels associated with access identities, which access identities are permitted to access the air interface, and/or the like) may be provided for cIoT UEs using a message, such as a paging message or a direct indication information, which may conserve battery power of cIoT UEs.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
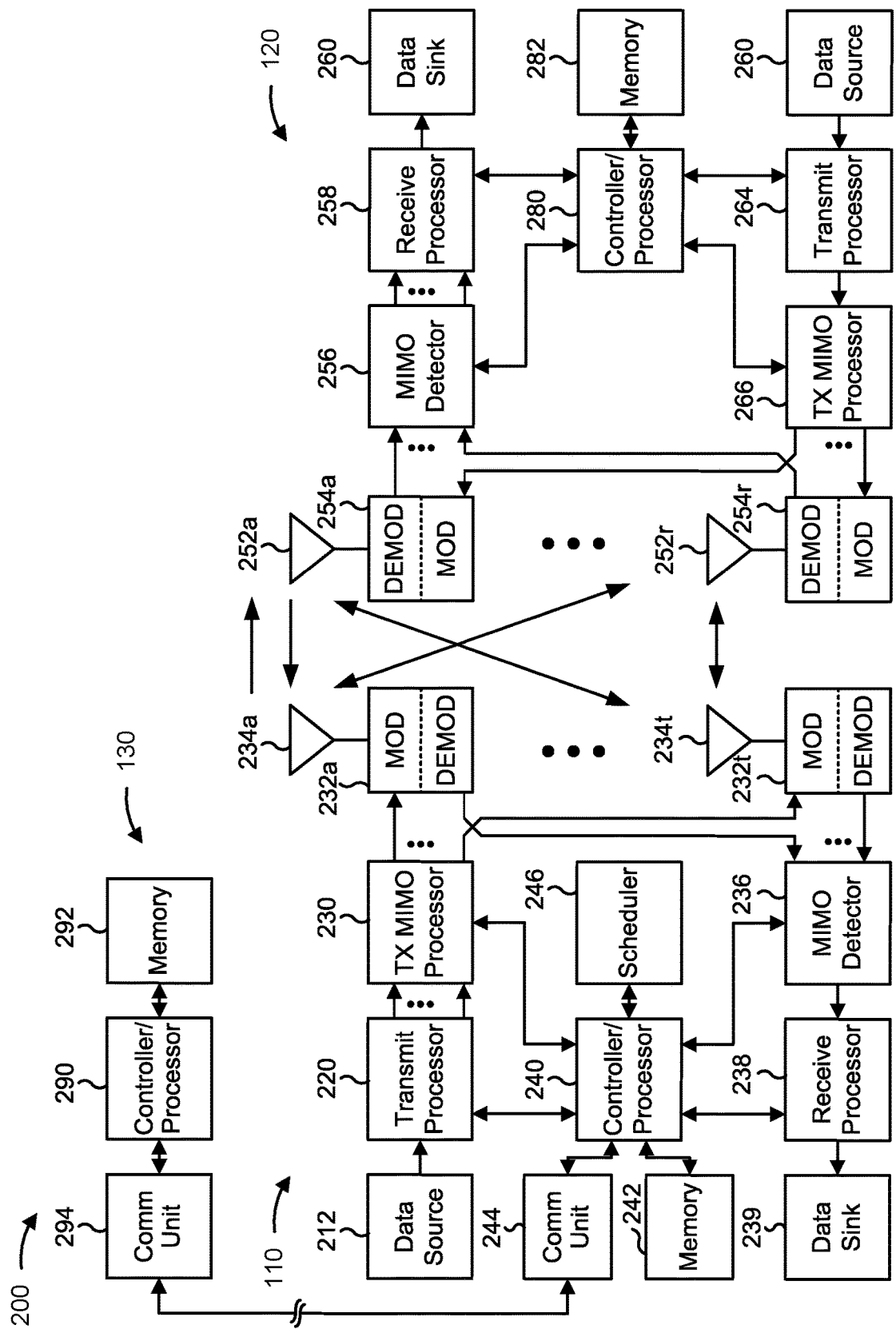
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), a reference signal received quality (RSRQ), a channel quality indicator (CQI), and/or the like.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with UAC parameter updating, as described in more detail elsewhere herein. For example, controller/processor 240 of base station 110, controller/processor 280 of UE 120, and/or any other component(s) of FIG. 2 may perform or direct operations of, for example, process 500 of FIG. 5, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

As noted above, various device types may be characterized as UEs. Starting in 3GPP Rel. 17, a number of these UE types are being allocated a new UE classification denoted as 'NR-Light'. Examples of UE types that fall under the NR-Light classification include wearable devices (e.g., smart watches, etc.), industrial sensors, video cameras (e.g., surveillance cameras, etc.), and so on. Generally, the UE types grouped under the NR-Light classification are associated with lower communicative capacity. For example, relative to 'normal' UEs (e.g., UEs not classified as NR-Light), NR-Light UEs may be limited in terms of maximum bandwidth (e.g., 5 MHz, 10 MHz, 20 MHz, etc.), maximum transmission power (e.g., 20 dBm, 14 dBm, etc.), number of receive antennas (e.g., 1 receive antenna, 2 receive antennas, etc.), and so on. Some NR-Light UEs may also be sensitive in terms of power consumption (e.g., requiring a long battery life, such as several years) and may be highly mobile. Moreover, in some designs, it is generally desirable for NR-Light UEs to co-exist with UEs implementing protocols such as eMBB, URLLC, LTE NB-IoT/MTC, and so on.

Protocols related to video surveillance via NR-Light have also been proposed for adoption by 3GPP Rel. 17. One example of such a protocol is 'large capacity MTC' (e.g., 100 streams with 2 Mbps per square kilometer) tailored for specific services, such as video in public services (e.g. city surveillance, traffic monitoring, etc.) or factory services (e.g., fish farm monitoring, mining supervising, etc.) with low cost and high efficiency. Another example of such a protocol is 'Mbps everywhere' (e.g., a large number of UEs or CPEs with fixed QoS uploading in the UL throughout a cell). Examples of Mbps everywhere include supporting 100+ cameras with 2 Mbps each per square kilometer for public services, supporting 20+ cameras with 25 Mbps each per sector, 1.5-2 times UL connection density/spectral efficiency (SE) improvement, and so on.

Figure 3:
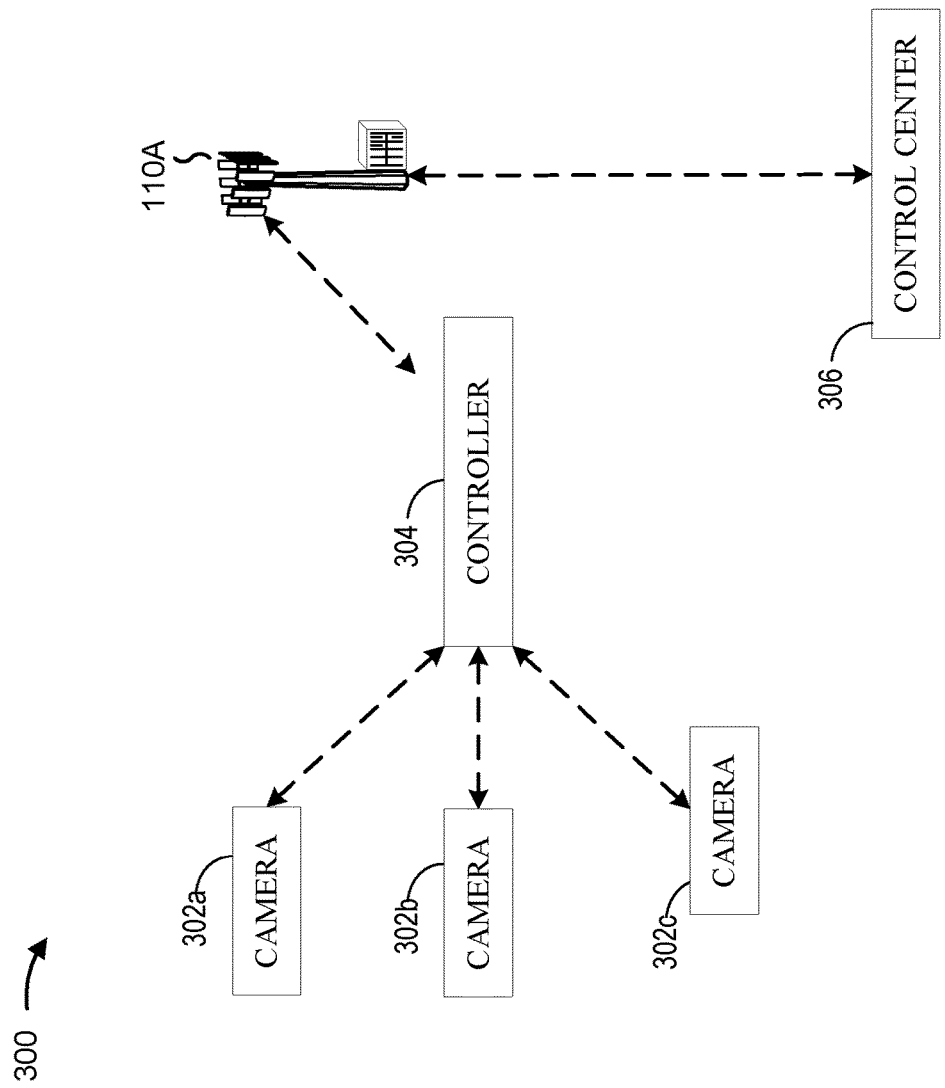
FIG. 3 illustrates a communications system in accordance with an embodiment of the disclosure.

FIG. 3 illustrates a communications system 300 in accordance with an embodiment of the disclosure. Referring to FIG. 3, a plurality of video cameras 302a, 302b and 302c (e.g., NR-Light UEs, which may be pluggable or stationary devices) are communicatively coupled to a video camera controller 304. The video camera controller 304 is in turn communicatively coupled to gNB 110A, which is in turn communicatively coupled to a control center 306.

Referring to FIG. 3, one or more of the video cameras 302a, 302b and 302c may be implemented as artificial intelligence (AI)-driven video cameras (or smart cameras) whereby motion detection can trigger alarms to the control center 306 and/or can activate remote monitoring and HD video uploading. For example, event-triggered video recording in this manner can reduce human effort associated with continuous video streaming and archiving. So, the video cameras 302a, 302b and 302c may be characterized as providing periodic low-resolution traffic (e.g., when there is no motion detected) and bursty or aperiodic high-resolution traffic (e.g., when motion is detected).

In addition to intelligent video streaming, the video cameras 302a, 302b and 302c may also implement smart storage protocols. For example, recorded or archived video data can be structured (e.g., evidence videos may be labeled with metadata characterizing a vehicle plate ID and vehicle color) as opposed to large files of uncategorized video files being stored.

Raw video footage captured by such video cameras may have a limited utility to law enforcement attempting to solve crimes and bring criminals to justice. For example, a criminal engaged in a crime caught on camera may hide her/her face with a mask, such that the criminal is not identifiable based on the video footage. Even in scenarios where a criminal is not masked and his/her face can be clearly seen in the video footage, identification of the criminal may still be difficult (e.g., facial recognition software may fail to map a detected face in the video footage to a user identity). However, it is common for criminals engaged in crimes to carry UEs (e.g., cell phones) which are often left on during the crimes.

Embodiments of the disclosure are thereby directed in part to a paging scheme whereby paging message(s) are transmitted by a node (e.g., UE, BS, or relay node, such as a video camera) to solicit paging message response(s) from UE(s) in a particular geographic area (e.g., in proximity to a detected event, such as a crime). In some designs, the paging messages may comprise reference value(s) that are also carried in the paging message response(s) along with UE-identifying information (e.g., such that a criminal engaged in a crime can be identified as being present nearby a crime area via detection of his/her UE). In further designs, the node may send the reference value(s) to a base station to permit the base station to take further action (e.g., victim notification). In some designs, the node may operate as a relay of the base station, in which case the relay and the base station may coordinate such that the paging message(s) transmitted by the relay do not conflict with paging message(s) transmitted by the base station.

Figure 4:
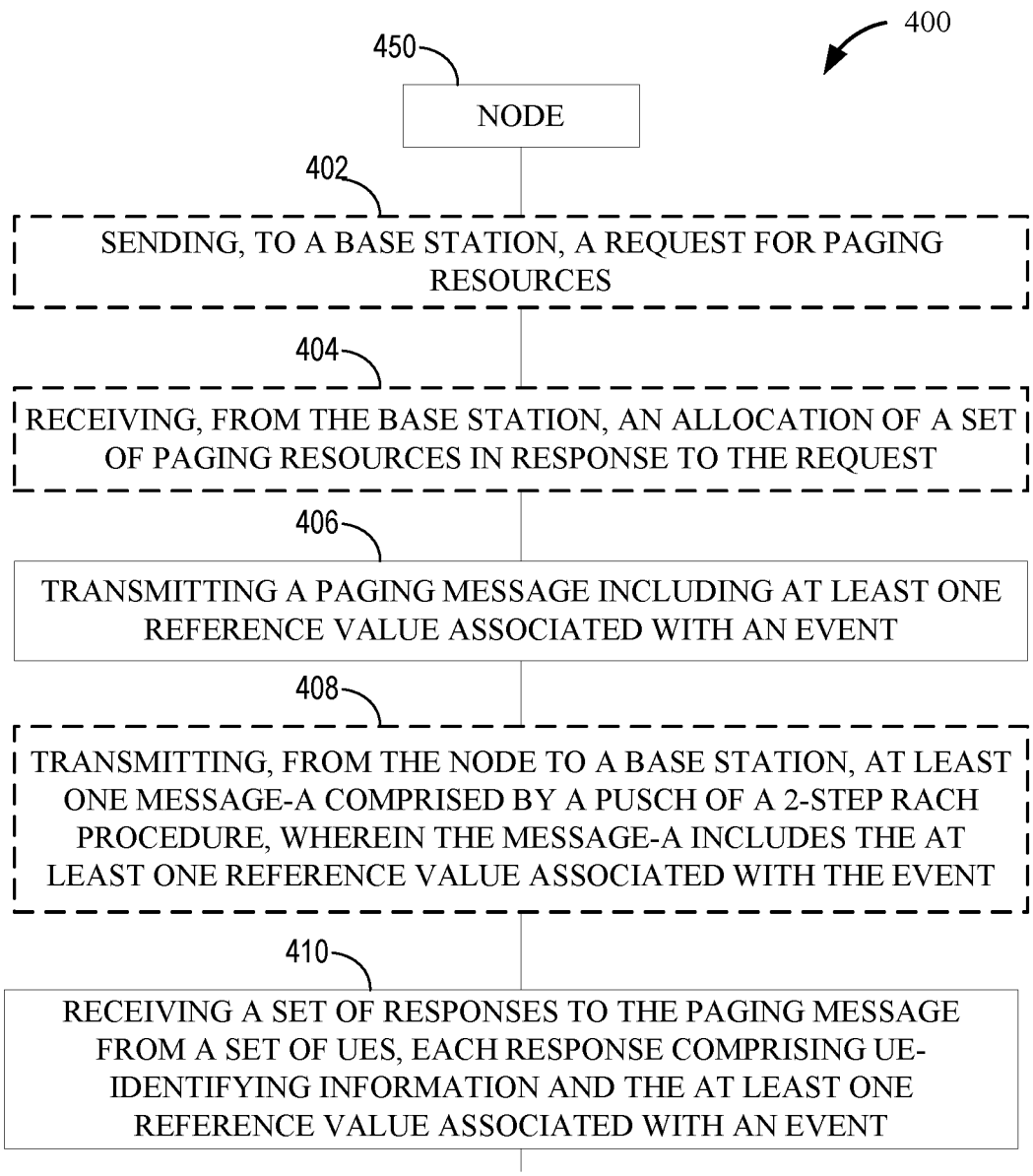
FIG. 4 illustrates an exemplary process of wireless communications according to an aspect of the disclosure.

FIG. 4 illustrates an exemplary process 400 of wireless communications according to an aspect of the disclosure. The process 400 of FIG. 4 is performed by a node 450, which may correspond to UE 120 or a BS 110 (e.g., a macro BS 110a or a relay 110d). In some designs, the node may comprise or be communicatively coupled to at least one video camera (e.g., video camera controller 304).

At 402, the node 450 (e.g., controller/processor 240, antenna(s) 234a . . . 234r, modulators(s) 232a . . . 232r, Tx MIMO processor 230, TX processor 220, communication unit 244, or controller/processor 280, antenna(s) 252a . . . 252r, modulators(s) 254a . . . 254r, TX MIMO processor 266, TX processor 264) optionally sends, to a base station, a request for paging resources. In some designs, the node 450 may correspond to a relay node (or station) of the base station, and the request can be forwarded via a backhaul connection (e.g., a wired or wireless backhaul connection). In other designs, the node 450 may correspond to a UE being served by the base station. In some designs, the transmission of 402 is optional because the node 450 may itself correspond to the base station. In other designs, the transmission of 402 is optional because the node 450 may transmit the paging message without coordination with the base station (e.g., for a highly localized or short-range paging message transmission that will not significantly interfere with paging messages from base station). In some designs, the request of 402 specifies at least one preferred SSB index (e.g., corresponding to a beam that is aligned with a geographical region where an event, such as a crime, has been detected). For example, in the case where the node 450 is a relay node (e.g., a small gNB having a set of antenna arrays), the node 450 may attempt to steer a paging message in a direction of the event (or crime scene) via a LoS link, whereby the antenna array of the node 450 may be capable of forming a directionally wide beam to make sure that only UEs close to the captured crime scene would receive the paging message.

In some designs, the request of 402 is transported via radio resource control (RRC) signaling, medium access control (MAC)-command element (CE) signaling, or uplink control information (UCI) signaling.

At 404, the node 450 (e.g., controller/processor 240, antenna(s) 234a . . . 234r, demodulators(s) 232a . . . 232r, MIMO detector 236, RX processor 238, communication unit 244, or controller/processor 280, antenna(s) 252a . . . 252r, demodulators(s) 254a . . . 254r, MIMO detector 256, RX processor 258) optionally receives, from the base station, an allocation of a set of paging resources in response to the request from 402. In some designs, if optional 402 is not performed, then optional 404 is likewise not performed. In some designs, 404 is optional because the node 450 may itself correspond to the base station. In some designs, the set of paging resources allocated may correspond to the paging resources requested at 402. However, in other designs, the set of paging resources allocated may differ (at least in part)

from the paging resources requested at 402. In some designs, the allocation of the set of paging resources comprises at least one SSB index (e.g., corresponding to a beam that is aligned with a geographical region where an event, such as a crime, has been detected). In some designs, the allocation of 404 is transported via RRC signaling, MAC-CE signaling, or downlink control information (DCI) signaling.

At 406, the node 450 (e.g., controller/processor 240, antenna(s) 234a . . . 234r, modulators(s) 232a . . . 232r, Tx MIMO processor 230, TX processor 220, or controller/processor 280, antenna(s) 252a . . . 252r, modulators(s) 254a . . . 254r, TX MIMO processor 266, TX processor 264) transmits a paging message including at least one reference value associated with an event. In some designs, the event may correspond to a crime detected in image data captured by a video camera that is communicatively coupled to the node 450. In some designs, the at least one reference value comprises a time value or a range of time values, location information, an event index value, or a combination thereof. In some designs, the paging message may be transmitted via the allocated set of paging resources (e.g., allocated SSB index(es)) from 404. In some designs, the presence of the at least one reference value in the paging message is configured to force any UEs (or a particular class of UEs, such as mobile UEs) to respond to the paging message irrespective of whether the paging message identifies the UEs in some manner (e.g., in contrast to a typical paging procedure whereby UEs only respond to paging messages that identify the UEs directly or indirectly via identification of a group to which the UEs belong).

At 408, the node 450 (e.g., controller/processor 240, antenna(s) 234a . . . 234r, modulators(s) 232a . . . 232r, Tx MIMO processor 230, TX processor 220, communication unit 244, or controller/processor 280, antenna(s) 252a . . . 252r, modulators(s) 254a . . . 254r, TX MIMO processor 266, TX processor 264) optionally transmits at least one Message-A comprised by a PUSCH of a 2-Step RACH procedure, wherein the Message-A includes the at least one reference value associated with the event. In some designs, 404 is optional because the node 450 may itself correspond to the base station. In an example, the Message-A may function as an alert to the base station that a particular event (e.g., a crime) has happened or is currently happening. In some designs, the at least one reference value may comprise information by which the base station can ascertain information associated with the event, such as victim identification information. In one particular example, the at least one reference value may comprise property identification (e.g., a vehicle license plate number) that is detected in captured image data by a video camera communicatively coupled to the node 450. So, if a criminal is detected as attempting to steal a vehicle, the owners of the vehicle can be looked up via the vehicle license plate number and then notified of the crime.

At 410, the node 450 (e.g., controller/processor 240, antenna(s) 234a . . . 234r, demodulators(s) 232a . . . 232r, MIMO detector 236, RX processor 238, or controller/processor 280, antenna(s) 252a . . . 252r, demodulators(s) 254a . . . 254r, MIMO detector 256, RX processor 258) receives a set of responses to the paging message from a set of UEs including at least one UE, each response comprising UE-identifying information and the at least one reference value associated with an event. In some designs, each response to the paging message may be made part of a record of which UEs were present near the event, which may assist with criminal investigation (e.g., identifying potential criminals, potential witnesses, etc.). For example, in certain countries (e.g., China, etc.), SIM cards are linked to user-specific identifiers, such that the UE-identifying information may function to identify a particular individual.

Figure 5:
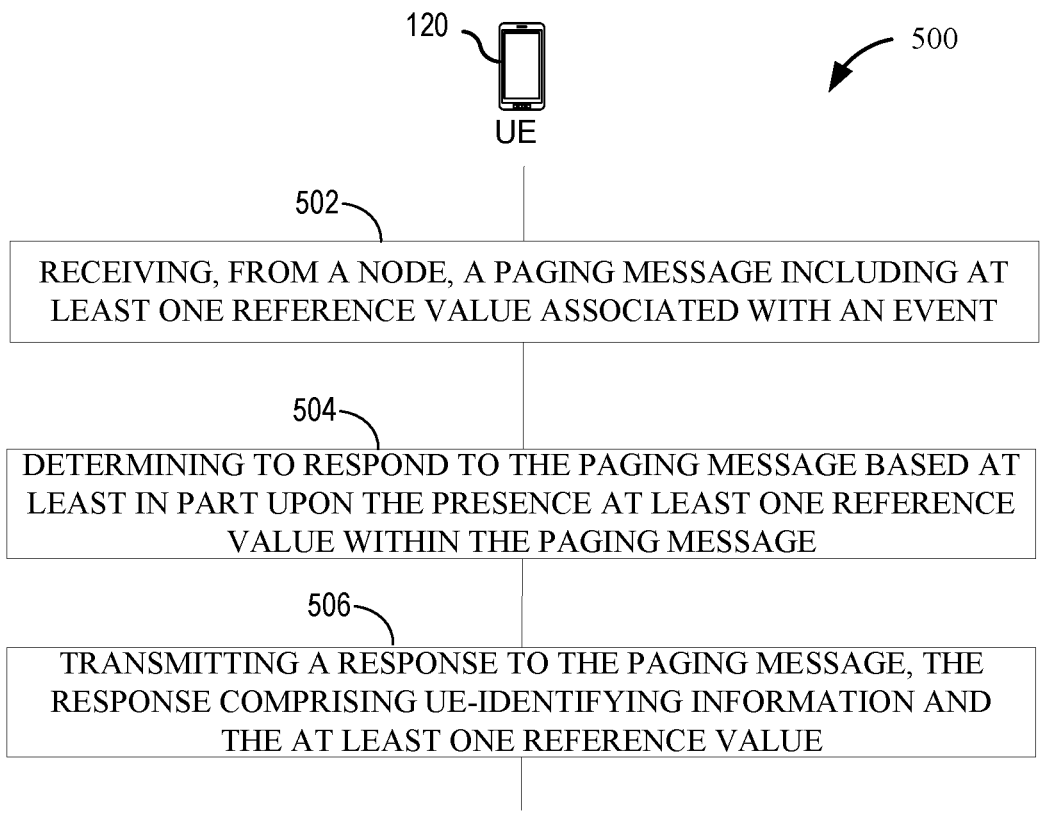
FIG. 5 illustrates an exemplary process of wireless communications according to another aspect of the disclosure.

FIG. 5 illustrates an exemplary process 500 of wireless communications according to another aspect of the disclosure. The process 500 of FIG. 5 is performed by UE 120.

At 502, the UE (e.g., controller/processor 280, antenna(s) 252a . . . 252r, demodulators(s) 254a . . . 254r, MIMO detector 256, RX processor 258) receives, from a node (e.g., node 450 of FIG. 4), a paging message including at least one reference value associated with an event. In an example, 502 may result from the transmission of the paging message at 406 of FIG. 4. In some designs, the paging message received at 502 does not identify the UE (e.g., either directly or indirectly via identification of a group to which the UEs belong). In some designs, the at least one reference value comprises a time value or a range of time values, location information, an event index value, or a combination thereof.

At 504, the UE (e.g., controller/processor 280) determines to respond to the paging message based at least in part upon the presence at least one reference value within the paging message. As noted with respect to 502, the paging message may not identify the UE (e.g., either directly or indirectly via identification of a group to which the UEs belong). This would typically cause the UE to ignore (i.e., not respond to) the paging message. However, in this example, the presence of the at least one reference value in the paging message is configured to force any UEs (or a particular class of UEs, such as mobile UEs) to respond to the paging message irrespective of whether the paging message identifies the UEs in some manner, resulting in the determination by the UE at 504.

At 506, the UE (e.g., controller/processor 280, antenna(s) 252a . . . 252r, modulators(s) 254a . . . 254r, TX MIMO processor 266, TX processor 264) transmits a response to the paging message, the response comprising UE-identifying information and the at least one reference value. Accordingly, even if the paging message from 502 failed to identify the UE (directly or indirectly), the paging response message includes the UE-identifying information to permit the node to associate the UE with the event. In a further example, the response to the paging message transmitted at 506 may be one of a plurality of responses to the paging message, whereby one or more other UEs (e.g., also in proximity to the event) may also transmit a response to the paging message. Accordingly, the process 500 of FIG. 5 may effectively execute in parallel at a plurality of UEs near a paging radius of the paging message (e.g., a geographical area of the event).

Figure 6:
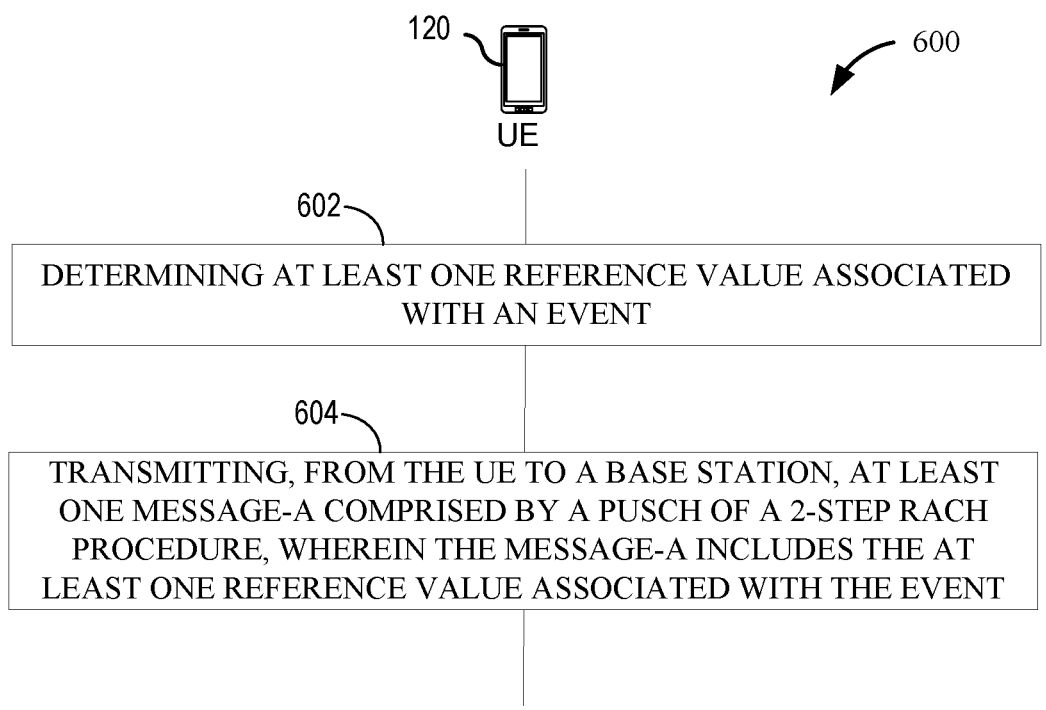
FIG. 6 illustrates an exemplary process of wireless communications according to another aspect of the disclosure.

FIG. 6 illustrates an exemplary process 600 of wireless communications according to another aspect of the disclosure. The process 600 of FIG. 6 is performed by UE 120.

At 602, the UE (e.g., controller/processor 280) determines at least one reference value associated with an event. In some designs, the at least one reference value determined at 602 may correspond to the reference value(s) in the paging message and paging response messages described with respect to FIGS. 4-5. In an example, the at least one reference value comprises a time value or a range of time values, location information, an event index value, or a combination thereof.

At 604, the UE (e.g., controller/processor 280, antenna(s) 252a . . . 252r, modulators(s) 254a . . . 254r, TX MIMO processor 266, TX processor 264) transmits, to a base station, at least one Message-A comprised by a PUSCH of a 2-Step RACH procedure, wherein the Message-A includes the at least one reference value associated with the event. As noted above with respect to 408, in an example, the Message-A may function as an alert to the base station that a particular event (e.g., a crime) has happened or is currently happening. In some designs, the at least one reference value may comprise information by which the base station can ascertain information associated with the event, such as victim identification information. In one particular example, the at least one reference value may comprise property identification (e.g., a vehicle license plate number) that is detected in captured image data by a video camera communicatively coupled to the UE. So, if a criminal is detected as attempting to steal a vehicle, the owners of the vehicle can be looked up via the vehicle license plate number and then notified of the crime.

Figure 7:
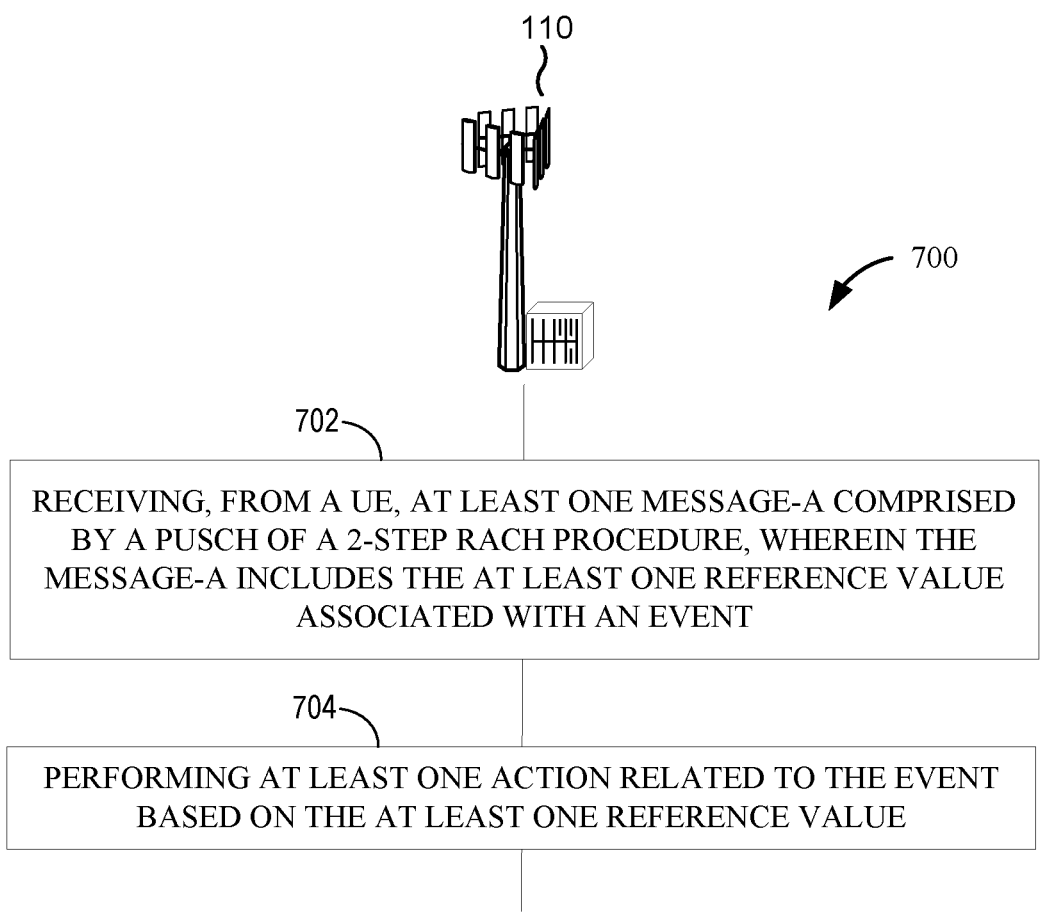
FIG. 7 illustrates an exemplary process of wireless communications according to another aspect of the disclosure.

FIG. 7 illustrates an exemplary process 700 of wireless communications according to another aspect of the disclosure. The process 700 of FIG. 7 is performed by BS 110.

At 702, the BS (e.g., controller/processor 240, antenna(s) 234a . . . 234r, demodulators(s) 232a . . . 232r, MIMO detector 236, RX processor 238) receives, from a UE at least one Message-A comprised by a PUSCH of a 2-Step RACH procedure, wherein the Message-A includes the at least one reference value associated with an event. In some designs, the Message-A received at 702 may result from the transmission of 604 of FIG. 6. In some designs, the at least one reference value may correspond to the reference value(s) in the paging message and paging response messages described with respect to FIGS. 4-5. In an example, the at least one reference value comprises a time value or a range of time values, location information, an event index value, or a combination thereof.

At 704, the BS (e.g., controller/processor 240, etc.) performs at least one action related to the event based on the at least one reference value. For example, the Message-A may function as an alert to the base station that a particular event (e.g., a crime) has happened or is currently happening. In some designs, the at least one reference value may comprise information by which the base station can ascertain information associated with the event, such as victim identification information. In one particular example, the at least one reference value may comprise property identification (e.g., a vehicle license plate number) that is detected in captured image data by a video camera communicatively coupled to the UE. So, if a criminal is detected as attempting to steal a vehicle, the action(s) performed at 704 may comprise looking up the owners of the vehicle via the vehicle license plate number and then notifying the owners of the crime.

Figure 8:
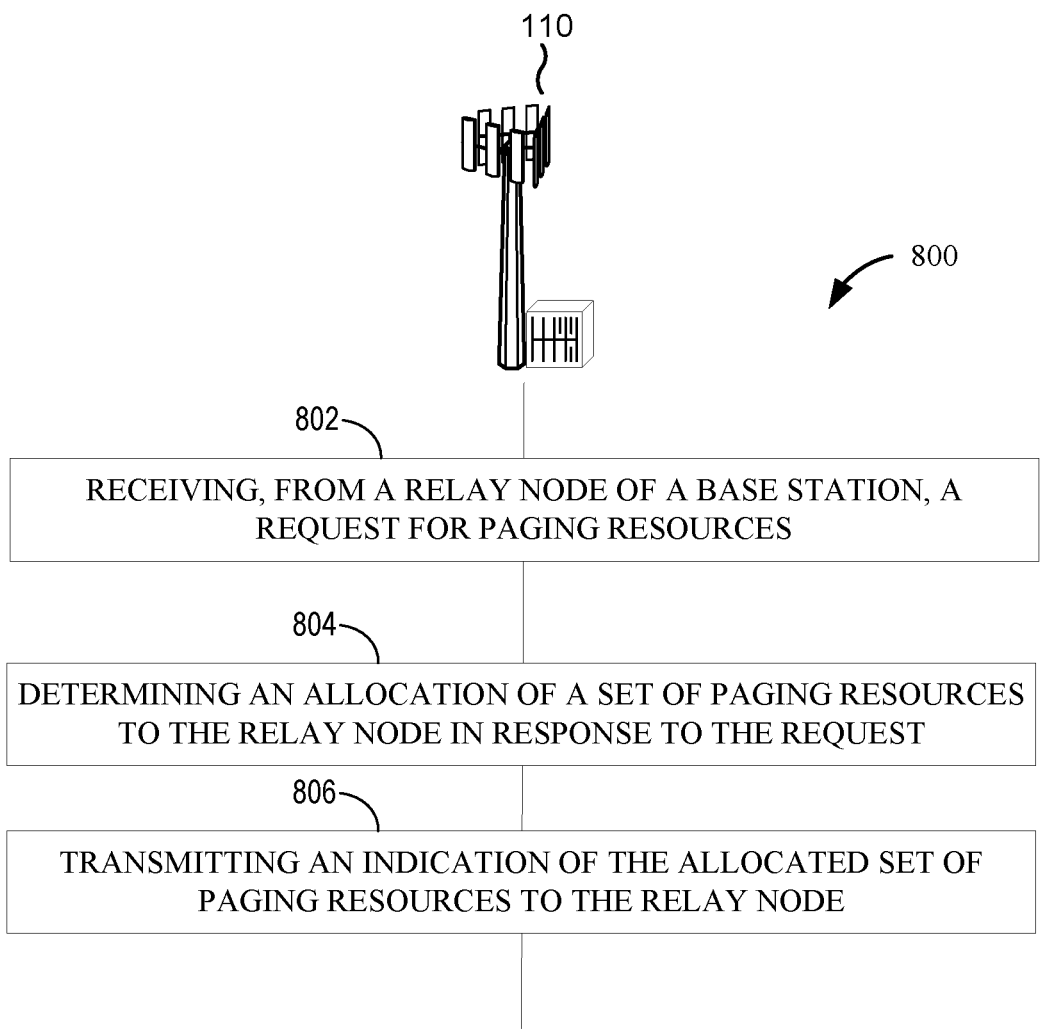
FIG. 8 illustrates an exemplary process of wireless communications according to another aspect of the disclosure.

FIG. 8 illustrates an exemplary process 800 of wireless communications according to another aspect of the disclosure. The process 800 of FIG. 8 is performed by BS 110 (e.g., a macro BS such BS 110a) communicatively coupled with a relay node (e.g., base station 110d, etc.).

At 802, the BS (e.g., controller/processor 240, antenna(s) 234a . . . 234r, demodulators(s) 232a . . . 232r, MIMO detector 236, RX processor 238) receives, from a relay node of a base station, a request for paging resources. In some designs, the reception of 802 may result from 402 of FIG. 4. In some designs, the request of 802 is received via a backhaul connection (e.g., a wired or wireless backhaul connection). In some designs, the request of 802 specifies at least one preferred SSB index (e.g., corresponding to a beam that is aligned with a geographical region where an event, such as a crime, has been detected at the relay node). For example, the relay node may first The relay node may firstly measure which SSB from the relay node would best match the direction of its video shooting, and then request that best-matching SSB to emulate the paging message in the request of 402. In some designs, the request of 802 is transported via radio resource control (RRC) signaling, medium access control (MAC)-command element (CE) signaling, or uplink control information (UCI) signaling.

At 804, the BS (e.g., controller/processor 240) determines an allocation of a set of paging resources to the relay node in response to the request. In some designs, the allocation of the set of paging resources comprises at least one SSB index (e.g., corresponding to a beam that is aligned with a geographical region where an event, such as a crime, has been detected). In some designs, the set of paging resources determined for allocation at 804 may correspond to the paging resources requested at 802. However, in other designs, the set of paging resources determined for allocation at 804 may differ (at least in part) from the paging resources requested at 802.

At 806, the BS (e.g., controller/processor 240, antenna(s) 234a . . . 234r, modulators(s) 232a . . . 232r, Tx MIMO processor 230, TX processor 220, communication unit 244) transmits an indication of the allocated set of paging resources to the relay node. In some designs, the indication of 806 is transmitted via a backhaul connection (e.g., a wired or wireless backhaul connection). In some designs, the indication of 806 is transported via RRC signaling, MAC-CE signaling, or downlink control information (DCI) signaling. The BS may further refrain from (or be precluded from) transmission of any paging messages on the allocated set of paging resources. For example, by refraining from transmission of any paging messages on the allocated set of paging resources, the relay node may transmit paging message(s) on the allocated set of paging resources without interference from the base station.

In some designs, the process 800 of FIG. 8 may help to an overload condition from occurring. For example, in NR, paging messages are repeated in association with different SSBs, such that a UE (especially an RRC-IDLE or RRC-INACTIVE UE) may need to firstly try to see which SSB is the strongest for its reception, then decode the paging message associated with this SSB. If the paging message containing the reference value(s) (e.g., LocationID and TimeStamp) is broadcasted to paging instances associated with all SSBs, the network may receive too many paging responses containing the reference value(s). By obtaining a preferred SSB from the relay node at 802 in accordance with FIG. 8, the base station can intelligently avoid interfering paging message transmissions with its own relay node while permitting the relay node to transmit on its preferred SSB.

As noted above with respect to FIGS. 4-8, in some designs, the at least one reference value comprises a time value or a range of time values, location information, an event index value, or a combination thereof. In an example, the time value may correspond to a time stamp (e.g., the time at which an event such as a crime was detected). In a further example, the range of time values may refer to a duration spanning some or all of the event. In a further example, the location information may designate a specific location (e.g., an address, a street intersection, geographic coordinates, etc.) or location range. In some designs, the at least one reference value may comprise a combination of a location identifier (ID) and a time stamp. In some designs, an upper layer protocol may make it mandatory for UEs receiving a paging message comprising the at least one reference value to report the at least one reference value along with the UE-identifying information (or UE-ID) to the network (e.g., even if the UE-ID for the UE is not contained in the pagingRecordList associated with the paging message). By contrast, 3GPP Rel. 15 and 3GPP Rel. 16 permit a UE not to respond to paging messages if the pagingRecordList does not contain its UE-ID. In a specific example, the reference values (e.g., Location ID, Time Stamp, etc.) can be added to a paging message configuration and SEQUENCE configuration as defined in 3GPP TS 38.331.

With respect to FIGS. 4-8, it will be appreciated that if a criminal powers off his/her phone, the paging message may not be received. In some designs, a real-time video stream may be established with a base station upon event detection. For example, a car owner can register his/her mobile phone number and car plate with an operator. Therefore, a base station or core network can receive an alarm from the video camera indicating unusual events with the vehicle and then can match the plate number with at least the phone number, and send a paging/alarm signal to a group of registered IDs. If the car owner (or other family members) are able to receive such an alarm and confirm the crime activity in real-time (e.g. by on-demand video clip), he/she can perform one or more of:

trigger an anti-theft device installed on the car, which can beep loudly or spray luminescent ink or lock the wheels, or call security guards/robots closest to the crime scene (based on positioning info provided by the camera arrays) to stop the criminals, or activate more surveillance cameras (mounted on lamp posts or drones, with LoS) to track/record the "footprints" of criminals.

In some designs, real-time is important in emergency cases, which may need signaling from lower layers, since application layer signaling may involve relatively long delays. In the above-noted examples, the reference value(s) may further include a Property ID (e.g., vehicle license plate, address, personal identifier, etc.) that can be mapped to a target for an event-related alert (e.g., an owner of property associated with a crime, or a family member thereof, etc.). In some designs, the above-noted alert can be implemented via a Message-A comprised by a PUSCH of a 2-Step RACH procedure at 408 of FIG. 4 or 704 of FIG. 7.

Figure 9:
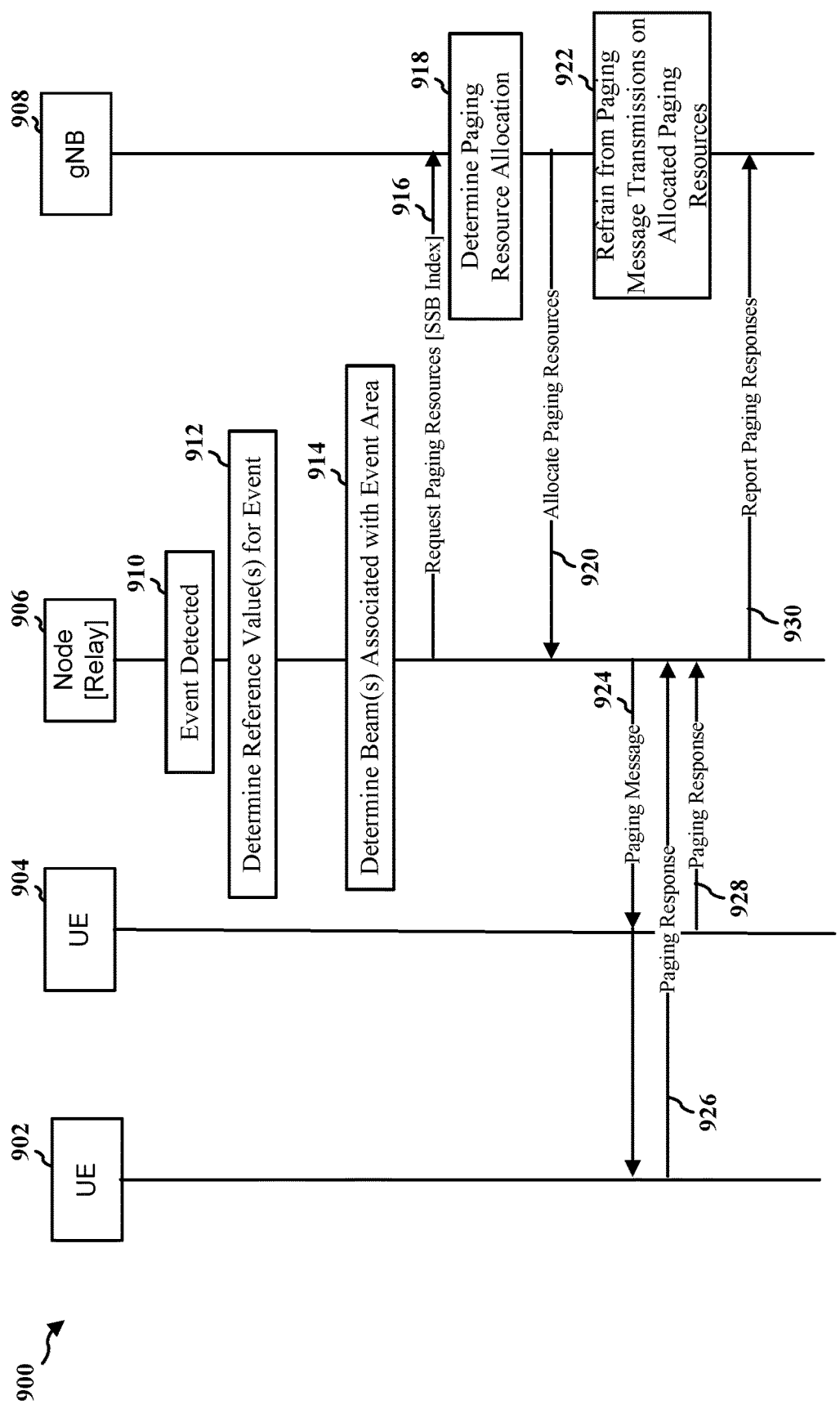
FIG. 9 illustrates an example implementation of one or more of the processes of FIGS. 4-8 in accordance with an embodiment of the disclosure.

FIG. 9 illustrates an example implementation of one or more of the processes 400-800 of FIGS. 4-8 in accordance with an embodiment of the disclosure. With respect to FIG. 9, a node 906 performing at least part of the process 400 of FIG. 4 corresponds to a relay node (e.g., BS 110*d*) of a base station (e.g., BS 110*a*) whereby the relay node 906 is communicatively coupled to at least one video camera.

Referring to FIG. 9, at 910, an event is detected at a relay node 906. In an example, the event may correspond to a crime that is detected based on an analysis of a video stream being captured by a video camera communicatively coupled to the relay node 906. At 912, the relay node 906 determines reference value(s) for the detected event. At 914, the relay node 906 determines one or more beam(s) associated with the event area. For example, the determined beam(s) at 912 may correspond to beam(s) which cover a geographical area that is being captured in the video stream of the video camera where the event was detected. At 916 (e.g., as in 402 of FIG. 4 or 802 of FIG. 8), the relay node 906 sends, to gNB 908, a request for at least one SSB index corresponding to the beam(s) determined at 914. At 918 (e.g., as in 804 of FIG. 8), gNB 908 determines paging resources (e.g., SSB index) for allocation to the relay node 906. At 920 (e.g., as in 404 of FIG. 4 or 806 of FIG. 8), gNB 908 transmits an indication of the paging resource allocation to the relay node 906. At 922, gNB 908 refrains from transmission of any paging messages on the allocated paging resources so as not to interfere with the relay node 906. At 924 (e.g., as in 406 of FIG. 4 or 502 of FIG. 5), the relay node 906 transmits a paging message including the reference value(s) determined at 912 over the allocated paging resources. UE 902 receives the paging message from 924, and at 926 (e.g., as in 410 of FIG. 4 or 504-506 of FIG. 5) transmits a paging response including UE-identifying information of UE 902 and the reference value(s). UE 904 also receives the paging message from 924, and at 928 (e.g., as in 410 of FIG. 4 or 504-506 of FIG. 5) transmits a paging response including UE-identifying information of UE 904 and the reference value(s). At 930, the relay node 906 reports the received paging responses to gNB 908 for archival.

Figure 10:
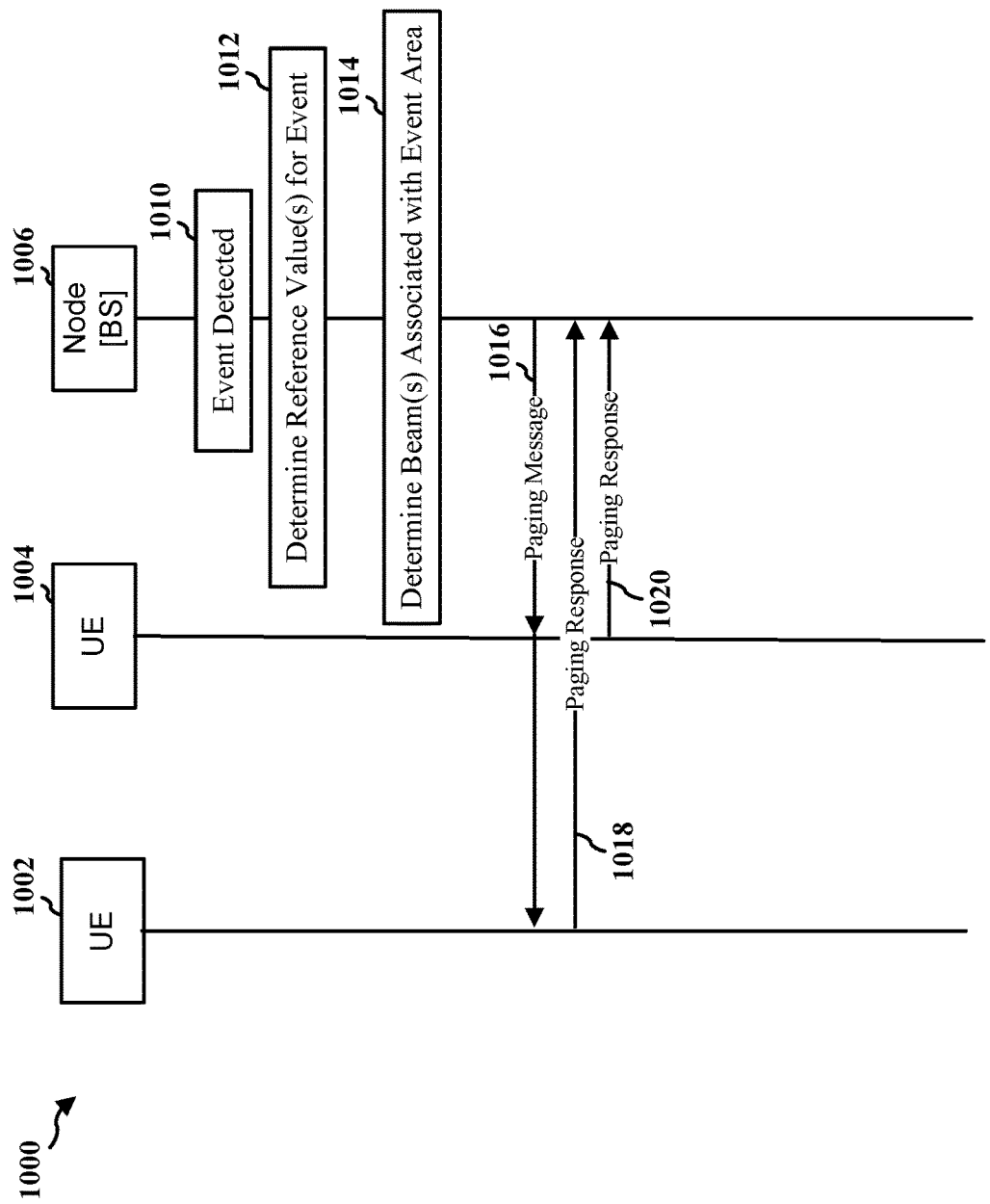
FIG. 10 illustrates an example implementation of one or more of the processes of FIGS. 4-8 in accordance with an embodiment of the disclosure.

FIG. 10 illustrates an example implementation of one or more of the processes 400-800 of FIGS. 4-8 in accordance with an embodiment of the disclosure. With respect to FIG. 10, a node 1006 performing at least part of the process 400 of FIG. 4 corresponds to a BS such as BS 110*a* whereby the BS node 1006 is communicatively coupled to at least one video camera.

Referring to FIG. 10, at 1010, an event is detected at BS node 1006. In an example, the event may correspond to a crime that is detected based on an analysis of a video stream being captured by a video camera communicatively coupled to the BS node 1006. At 1012, the BS node 1006 determines reference value(s) for the detected event. At 1014, the BS node 1006 determines reference value(s) for the detected event. At 1014, the BS node 1006 determines one or more beam(s) associated with the event area. For example, the determined beam(s) at 1014 may correspond to beam(s) which cover a geographical area that is being captured in the video stream of the video camera where the event was detected. At 1016 (e.g., as in 406 of FIG. 4 or 502 of FIG. 5), the BS node 1006 transmits a paging message including the reference value(s) determined at 1012 over an SSB index associated with the beam(s) determined at 1014. UE 1002 receives the paging message from 1016, and at 1018 (e.g., as in 410 of FIG. 4 or 504-506 of FIG. 5) transmits a paging response including UE-identifying information of UE 1002 and the reference value(s). UE 1004 also receives the paging message from 1016, and at 1020 (e.g., as in 410 of FIG. 4 or 504-506 of FIG. 5) transmits a paging response including UE-identifying information of UE 1004 and the reference value(s).

Figure 11:
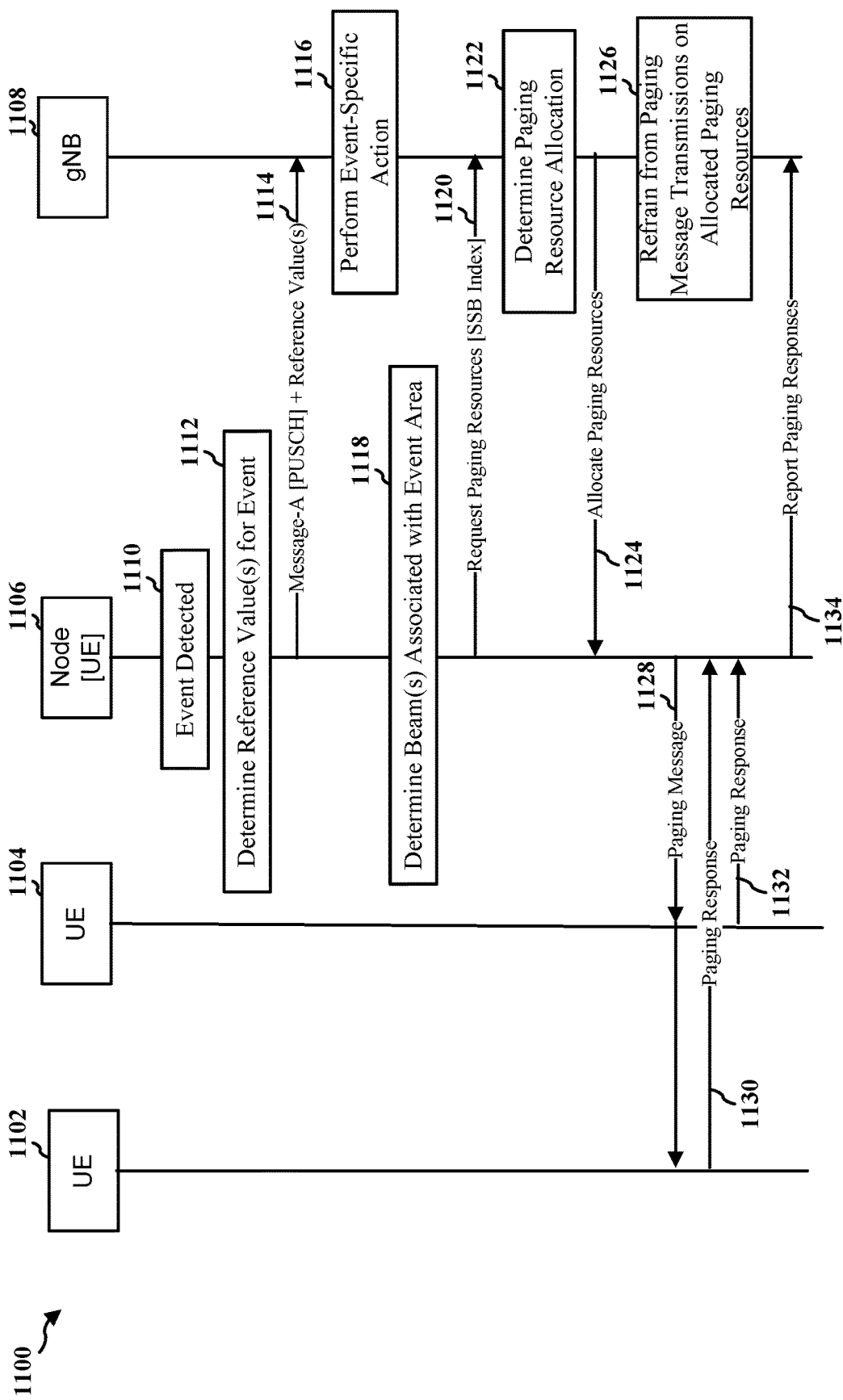
FIG. 11 illustrates an example implementation of one or more of the processes of FIGS. 4-8 in accordance with an embodiment of the disclosure.

FIG. 11 illustrates an example implementation of one or more of the processes 400-800 of FIGS. 4-8 in accordance with an embodiment of the disclosure. With respect to FIG. 11, a node 1106 performing at least part of the process 400 of FIG. 4 corresponds to a UE (e.g., UE 120) whereby the UE node 1106 is communicatively coupled to at least one video camera.

Referring to FIG. 11, at 1110, an event is detected at the UE node 1106. In an example, the event may correspond to a crime that is detected based on an analysis of a video stream being captured by a video camera communicatively coupled to the UE node 1106. At 1112, the UE node 1106 determines reference value(s) for the detected event. At 1114 (e.g., as at 604 of FIG. 6 or 702 of FIG. 7), the UE node 1106 transmits, to gNB 1108, at least one Message-A comprised by a PUSCH of a 2-Step RACH procedure and including the reference value(s) determined at 1112. At 1116 (e.g., as at 704 of FIG. 7), gNB 1108 performs at least one action related to the event based on the at least one reference value. At 1118, UE node 1106 determines one or more beam(s) associated with the event area. For example, the determined beam(s) at 1118 may correspond to beam(s) which cover a geographical area that is being captured in the video stream of the video camera where the event was detected. At 1120

(e.g., as in 402 of FIG. 4 or 802 of FIG. 8), the UE node 1106 sends, to gNB 1108, a request for at least one SSB index corresponding to the beam(s) determined at 1118. At 1122 (e.g., as in 804 of FIG. 8), gNB 1108 determines paging resources (e.g., SSB index) for allocation to the UE node 1106. At 1124 (e.g., as in 404 of FIG. 4 or 806 of FIG. 8), gNB 1108 transmits an indication of the paging resource allocation to the UE node 1106. At 1126, gNB 1108 refrains from transmission of any paging messages on the allocated paging resources so as not to interfere with the UE node 1106. At 1128 (e.g., as in 406 of FIG. 4 or 502 of FIG. 5), the UE node 1106 transmits a paging message including the reference value(s) determined at 1112 over the allocated paging resources. UE 1102 receives the paging message from 1128, and at 1130 (e.g., as in 410 of FIG. 4 or 504-506 of FIG. 5) transmits a paging response including UE-identifying information of UE 1102 and the reference value(s). UE 1104 also receives the paging message from 1128, and at 1132 (e.g., as in 410 of FIG. 4 or 504-506 of FIG. 5) transmits a paging response including UE-identifying information of UE 1104 and the reference value(s). At 1134, the UE node 1106 reports the received paging responses to gNB 1108 for archival.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

Figure 12:
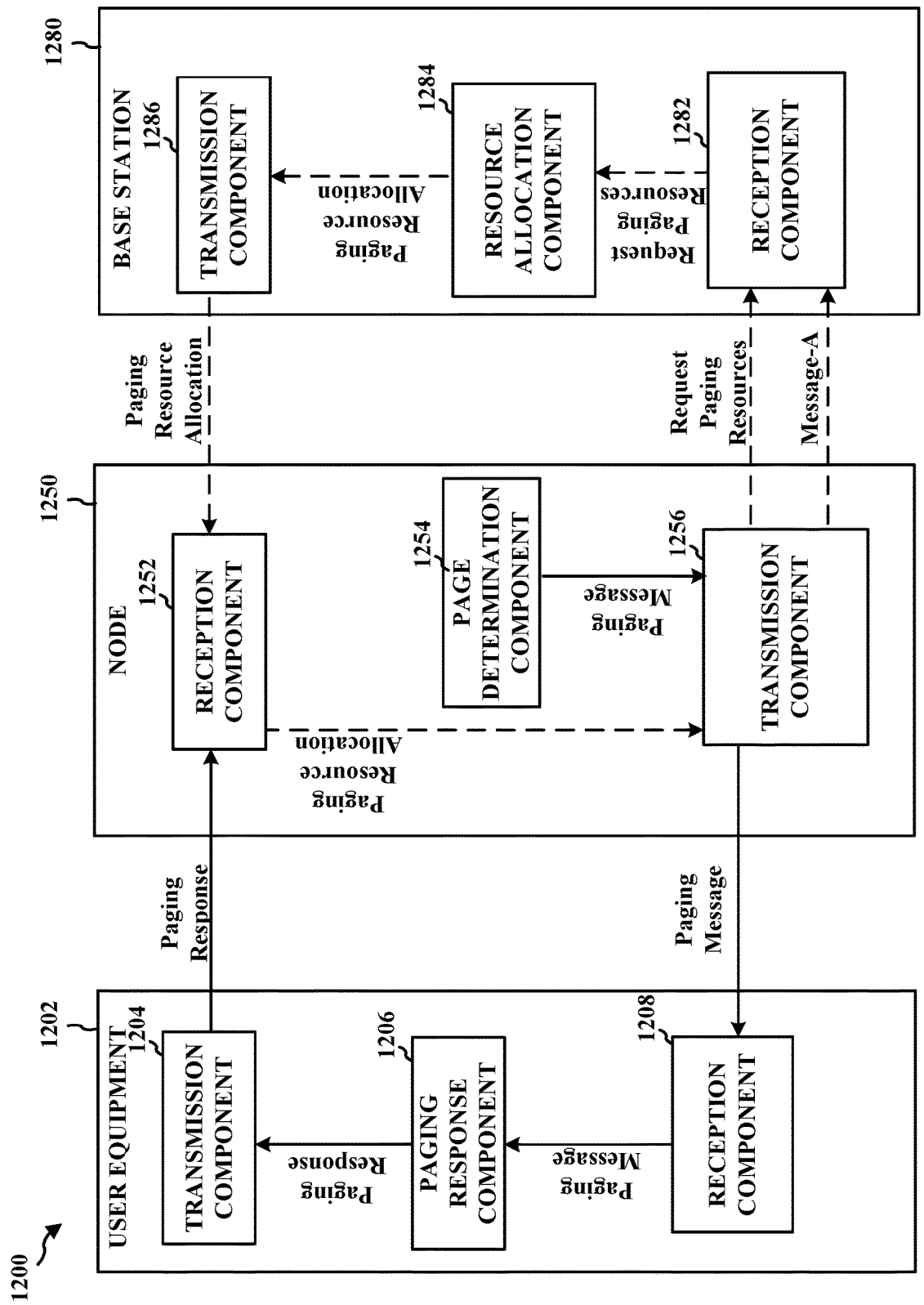
FIG. 12 is a conceptual data flow diagram illustrating data flow between different means/components according to an aspect of the disclosure.

FIG. 12 is a conceptual data flow diagram 1200 illustrating the data flow between different means/components in exemplary apparatuses 1202, 1250 and 1280. The apparatus 1202 may be a UE in communication with an apparatus 1250, which may be another UE, a relay node (e.g., BS 110d) or a base station (e.g., a non-relay BS such as BS 110a). The apparatus 1250 may in turn be optionally in communication with an apparatus 1280, which may be a non-relay base station. In some designs, the apparatus 1280 is optional because the apparatus 1250 may itself correspond to a non-relay base station.

The apparatus 1202 includes a transmission component 1204, which may correspond to transmitter circuitry in UE 120 as depicted in FIG. 2, including controller/processor 280, antenna(s) 252a . . . 252r, modulators(s) 254a . . . 254r, TX MIMO processor 266, TX processor 264. The apparatus 1202 further includes a paging response component 1206, which may correspond to processor circuitry in UE 120 as depicted in FIG. 2, including controller/processor 280, TX MIMO processor 266, TX processor 264, etc. The apparatus 1202 further includes a reception component 1208, which may correspond to receiver circuitry in UE 120 as depicted in FIG. 2, including controller/processor 280, antenna(s) 252a . . . 252r, demodulators(s) 254a . . . 254r, MIMO detector 256, RX processor 258.

The apparatus 1250 includes a reception component 1252, which may correspond to receiver circuitry in BS 110 or UE 120 as depicted in FIG. 2, including controller/processor 240, antenna(s) 234a . . . 234r, demodulators(s) 232a . . . 232r, MIMO detector 236, RX processor 238, communication unit 244, or controller/processor 280, antenna(s) 252a . . . 252r, demodulators(s) 254a . . . 254r, MIMO detector 256, RX processor 258. The apparatus 1250 further a includes page determination component 1254, which may correspond to processor circuitry in BS 110 or UE 120 as depicted in FIG. 2, including controller/processor 240 or controller/processor 280. The apparatus 1250 further includes a transmission component 1256, which may correspond to transmission circuitry in BS 110 or UE 120 as depicted in FIG. 2, including e.g., controller/processor 240, antenna(s) 234a . . . 234r, modulators(s) 232a . . . 232r, Tx MIMO processor 230, TX processor 220, communication unit 244, or controller/processor 280, antenna(s) 252a . . . 252r, modulators(s) 254a . . . 254r, TX MIMO processor 266, TX processor 264.

The apparatus 1280 includes a reception component 1282, which may correspond to receiver circuitry in BS 110 as depicted in FIG. 2, including controller/processor 240, antenna(s) 234a . . . 234r, demodulators(s) 232a . . . 232r, MIMO detector 236, RX processor 238, communication unit 244. The apparatus 1250 further a includes resource allocation component 1284, which may correspond to processor circuitry in BS 110 as depicted in FIG. 2, including controller/processor 240. The apparatus 1280 further includes a transmission component 1286, which may correspond to transmission circuitry in BS 110 as depicted in FIG. 2, including e.g., controller/processor 240, antenna(s) 234a . . . 234r, modulators(s) 232a . . . 232r, Tx MIMO processor 230, TX processor 220, communication unit 244.

Referring to FIG. 12, the page determination component 1254 of the apparatus 1250 determines to send a paging message (e.g., in response to a detected event so as to identify UEs nearby the detected event). This determination by the page determination component 1254 of the apparatus 1250 optionally triggers the transmission component 1256 of the apparatus 1250 to transmit a request for paging resources to the reception component 1282 of the apparatus 1280. This determination by the page determination component 1254 of the apparatus 1250 also optionally triggers the transmission component 1256 of the apparatus 1250 to transmit a Message-A comprised by a PUSCH of a 2-Step RACH procedure, wherein the Message-A includes at least one reference value associated with the event. The reception component 1282 of the apparatus 1280 forwards the request for paging resources to the resource allocation component 1284 of the apparatus 1280. The resource allocation component 1284 of the apparatus 1280 determines a paging resource allocation in response to the request, which is forwarded to the transmission component 1286 of the apparatus 1280 for transmission to the reception component 1252 of the apparatus 1250. The reception component 1252 of the apparatus 1250 notifies the transmission component 1256 of the paging resource allocation, and the transmission component 1256 of the apparatus 1250 transmits the paging message (including the reference value(s)) in accordance with the paging resource allocation.

Referring to FIG. 12, the reception component 1208 of the apparatus 1202 receives the paging message and forwards the paging message to the paging response component 1206 of the apparatus 1202. The paging response component 1206 of the apparatus 1202 determines to transmit a paging response in response to the paging message, which is forwarded to the transmission component 1204 of the apparatus 1202. The transmission component 1204 of the apparatus 1202 transmits the paging response (including UE-identifying information and the including the reference value(s)) to the reception component 1252 of the apparatus 1250.

One or more components of the apparatus 1202, apparatus 1250 and apparatus 1280 may perform each of the blocks of the algorithm in the aforementioned flowcharts of FIGS. 4-11. As such, each block in the aforementioned flowcharts of FIGS. 4-11 may be performed by a component and the apparatus 1202, apparatus 1250 or apparatus 1280 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 13:
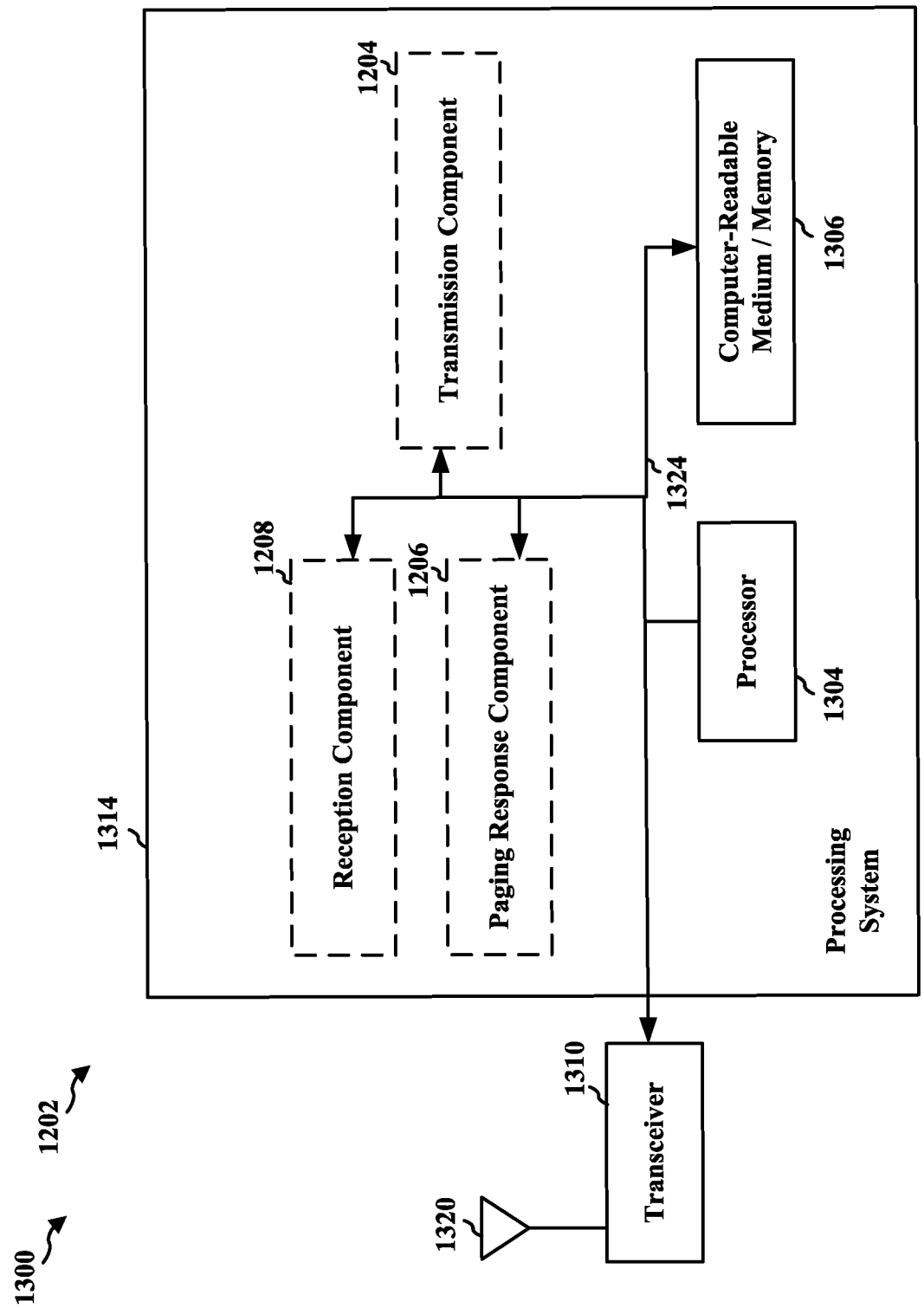
FIG. 13 is a diagram illustrating an example of a hardware implementation for an apparatus employing a processing system according to an aspect of the disclosure.

FIG. 13 is a diagram 1300 illustrating an example of a hardware implementation for an apparatus 1202 employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware components, represented by the processor 1304, the components 1204, 1206 and 1208, and the computer-readable medium/memory 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The transceiver 1310 receives a signal from the one or more antennas 1320, extracts information from the received signal, and provides the extracted information to the processing system 1314, specifically the reception component 1204. In addition, the transceiver 1310 receives information from the processing system 1314, specifically the transmission component 1208, and based on the received information, generates a signal to be applied to the one or more antennas 1320. The processing system 1314 includes a processor 1304 coupled to a computer-readable medium/memory 1306. The processor 1304 is responsible for general processing, including the execution of software stored on the computer-readable medium/memory 1306. The software, when executed by the processor 1304, causes the processing system 1314 to perform the various functions described supra for any particular apparatus. The computer-readable medium/memory 1306 may also be used for storing data that is manipulated by the processor 1304 when executing software. The processing system 1314 further includes at least one of the components 1204, 1206 and 1208. The components may be software components running in the processor 1304, resident/stored in the computer readable medium/memory 1306, one or more hardware components coupled to the processor 1304, or some combination thereof. The processing system 1314 may be a component of the UE 120 of FIG. 2 and may include the memory 282, and/or at least one of the TX processor 264, the RX processor 258, and the controller/processor 280.

In one configuration, the apparatus 1202 for wireless communication includes means for receiving, from a node, a paging message including at least one reference value associated with an event, means for determining to respond to the paging message based at least in part upon the presence at least one reference value within the paging message, and means for transmitting a response to the paging message, the response comprising UE-identifying information and the at least one reference value. In another configuration, the apparatus 1202 for wireless communication includes means for determining at least one reference value associated with an event, and means for transmitting, from the UE to a base station, at least one Message-A comprised by a PUSCH of a 2-Step RACH procedure, wherein the Message-A includes the at least one reference value associated with the event. The aforementioned means may be one or more of the aforementioned components of the apparatus 1202 and/or the processing system 1314 of the apparatus 1202 configured to perform the functions recited by the aforementioned means. As described supra, the processing system 1314 may include the TX processor 264, the RX processor 258, and the controller/processor 280.

Figure 14:
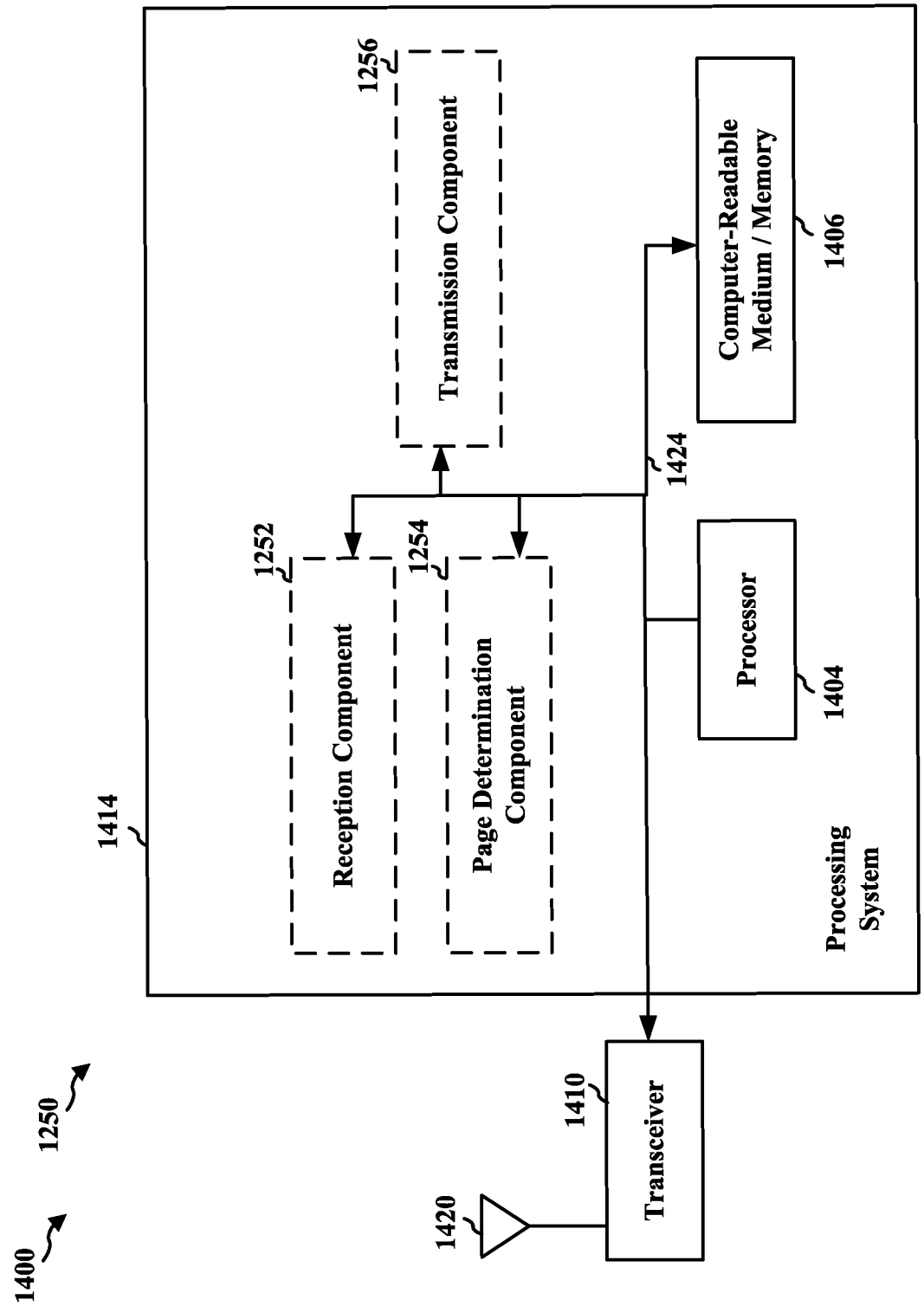
FIG. 14 is a diagram illustrating an example of a hardware implementation for an apparatus employing a processing system according to another aspect of the disclosure.

FIG. 14 is a diagram 1400 illustrating an example of a hardware implementation for an apparatus 1250 employing a processing system 1414. The processing system 1414 may be implemented with a bus architecture, represented generally by the bus 1424. The bus 1424 may include any number of interconnecting buses and bridges depending on the specific application of the processing system 1414 and the overall design constraints. The bus 1424 links together various circuits including one or more processors and/or hardware components, represented by the processor 1404, the components 1252, 1254 and 1256, and the computer-readable medium/memory 1406. The bus 1424 may also link various other circuits such as timing sources, peripherals, voltage regulators, and power management circuits, which are well known in the art, and therefore, will not be described any further.

The processing system 1414 may be coupled to a transceiver 1410. The transceiver 1410 is coupled to one or more antennas 1420. The transceiver 1410 provides a means for communicating with various other apparatus over a transmission medium. The transceiver 1410 receives a signal from the one or more antennas 1420, extracts information from the received signal, and provides the extracted information to the processing system 1414, specifically the reception component 1252. In addition, the transceiver 1410 receives information from the processing system 1414, specifically the transmission component 1256, and based on the received information, generates a signal to be applied to the one or more antennas 1420. The processing system 1414 includes a processor 1404 coupled to a computer-readable medium/memory 1406. The processor 1404 is responsible for general processing, including the execution of software stored on the computer-readable medium/memory 1406. The software, when executed by the processor 1404, causes the processing system 1414 to perform the various functions described supra for any particular apparatus. The computer-readable medium/memory 1406 may also be used for storing data that is manipulated by the processor 1404 when executing software. The processing system 1414 further includes at least one of the components 1252, 1254 and 1256. The components may be software components running in the processor 1404, resident/stored in the computer readable medium/memory 1406, one or more hardware components coupled to the processor 1404, or some combination thereof. The processing system 1414 may be a component of the BS 110 of FIG. 2 (e.g., a relay node or BS or non-relay BS) or the UE 120 of FIG. 2 and may include the memory 242, and/or at least one of the TX processor 220, the RX processor 238, and the controller/processor 240, or alternatively the memory 282, and/or at least one of the TX processor 264, the RX processor 258, and the controller/processor 280.

In one configuration, the apparatus 1250 for wireless communication includes means for transmitting a paging message including at least one reference value associated with an event, and receiving a set of responses to the paging message from a set of UEs including at least one UE, each response comprising UE-identifying information and the at least one reference value associated with an event. The apparatus 1250 for wireless communication further optionally includes means for sending, to the base station, a request for paging resources, and means for receiving, from the base station, an allocation of a set of paging resources in response to the request. The apparatus 1250 for wireless communication further optionally includes means for transmitting, from the node to a base station, at least one Message-A comprised by a PUSCH of a 2-Step RACH procedure, wherein the Message-A includes the at least one reference value associated with the event. The aforementioned means may be one or more of the aforementioned components of the apparatus 1250 and/or the processing system 1414 of the apparatus 1250 configured to perform the functions recited by the aforementioned means. As described supra, the processing system 1414 may include the TX processor 264, the RX processor 258, and the controller/processor 280, or the controller/processor 240, TX processor 220, and RX processor 238.

Figure 15:
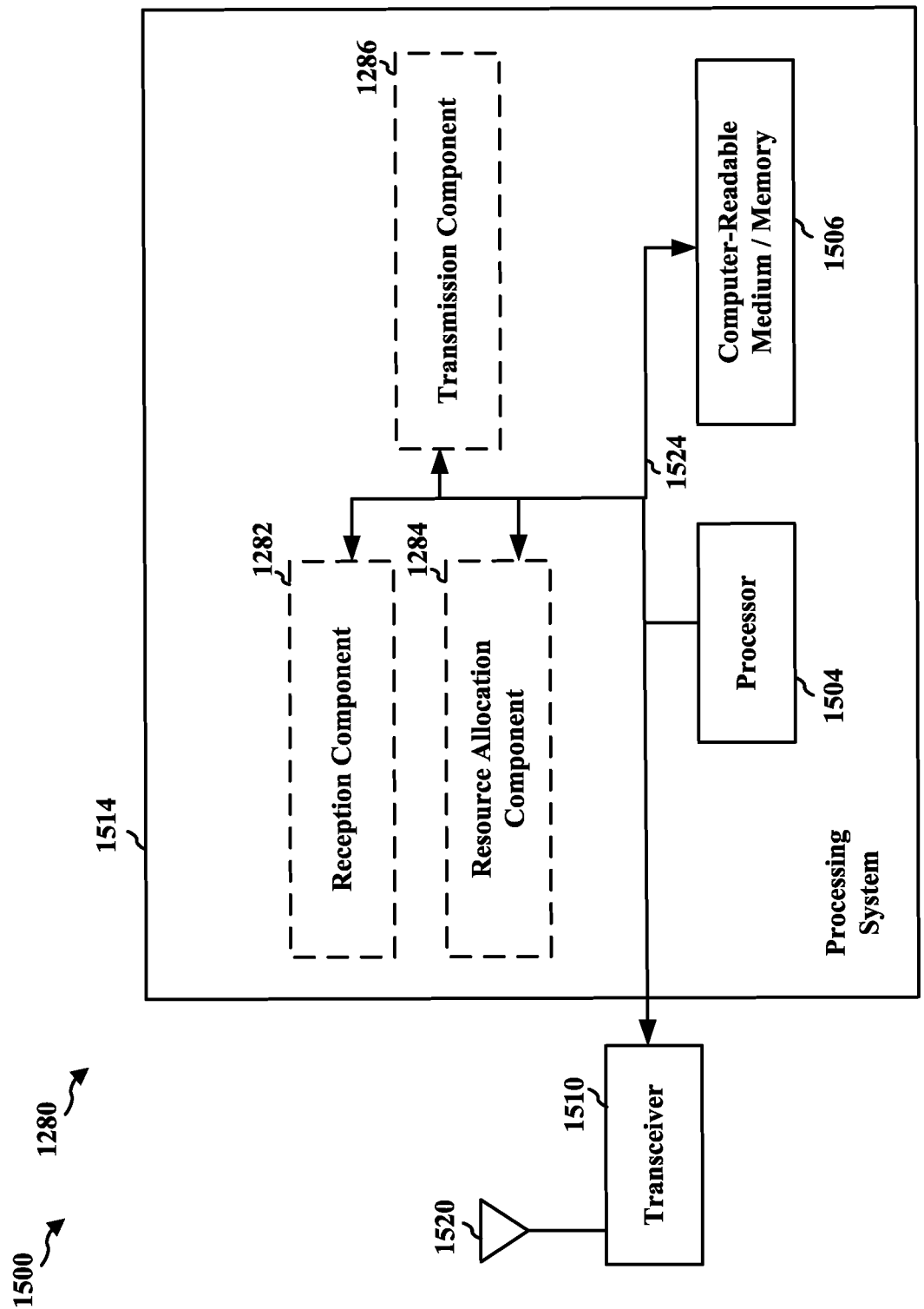
FIG. 15 is a diagram illustrating an example of a hardware implementation for an apparatus employing a processing system according to another aspect of the disclosure.

FIG. 15 is a diagram 1500 illustrating an example of a hardware implementation for an apparatus 1280 employing a processing system 1514. The processing system 1514 may be implemented with a bus architecture, represented generally by the bus 1524. The bus 1524 may include any number of interconnecting buses and bridges depending on the specific application of the processing system 1514 and the overall design constraints. The bus 1524 links together various circuits including one or more processors and/or hardware components, represented by the processor 1504, the components 1282, 1284 and 1286, and the computer-readable medium/memory 1506. The bus 1524 may also link various other circuits such as timing sources, peripherals, voltage regulators, and power management circuits, which are well known in the art, and therefore, will not be described any further.

The processing system 1514 may be coupled to a transceiver 1510. The transceiver 1510 is coupled to one or more antennas 1520. The transceiver 1510 provides a means for communicating with various other apparatus over a transmission medium. The transceiver 1510 receives a signal from the one or more antennas 1520, extracts information from the received signal, and provides the extracted information to the processing system 1514, specifically the reception component 1282. In addition, the transceiver 1510 receives information from the processing system 1514, specifically the transmission component 1286, and based on the received information, generates a signal to be applied to the one or more antennas 1520. The processing system 1514 includes a processor 1504 coupled to a computer-readable medium/memory 1506. The processor 1504 is responsible for general processing, including the execution of software stored on the computer-readable medium/memory 1506. The software, when executed by the processor 1504, causes the processing system 1514 to perform the various functions described supra for any particular apparatus. The computer-readable medium/memory 1506 may also be used for storing data that is manipulated by the processor 1504 when executing software. The processing system 1514 further includes at least one of the components 1282, 1284 and 1286. The components may be software components running in the processor 1504, resident/stored in the computer readable medium/memory 1506, one or more hardware components coupled to the processor 1504, or some combination thereof. The processing system 1514 may be a component of the BS 110 of FIG. 2 (e.g., a relay node or BS or non-relay BS) and may include the memory 242, and/or at least one of the TX processor 220, the RX processor 238, and the controller/processor 240.

In one configuration, the apparatus 1280 for wireless communication includes means for receiving, from a user equipment (UE), at least one Message-A comprised by a Physical Uplink Shared Channel (PUSCH) of a 2-Step Random Access Channel (RACH) procedure, wherein the Message-A includes the at least one reference value associated with an event, and means for performing at least one action related to the event based on the at least one reference value. In another configuration, the apparatus 1280 for wireless communication includes receiving, from a relay node of a base station, a request for paging resources, means for determining an allocation of a set of paging resources to the relay node in response to the request, and means for transmitting an indication of the allocated set of paging resources to the relay node, wherein the base station is precluded from transmission of any paging messages on the allocated set of paging resources. The aforementioned means may be one or more of the aforementioned components of the apparatus 1280 and/or the processing system 1514 of the apparatus 1280 configured to perform the functions recited by the aforementioned means. As described supra, the processing system 1514 may include the controller/processor 240, TX processor 220, and RX processor 238.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communications by a node, comprising:

transmitting a paging message including at least one reference value associated with an event that is detected as being in progress in a target geographical area; and
receiving a set of responses to the paging message from a set of UEs including at least one UE, each response comprising UE-identifying information and the at least one reference value associated with the event.

2. The method of claim 1, further comprising:
transmitting, from the node to a wireless network component, at least one Message-A comprised by a PUSCH of a 2-Step RACH procedure, wherein the Message-A includes the at least one reference value associated with the event.

3. The method of claim 1, wherein the at least one reference value comprises a time value or a range of time values, location information, an event index value, or a combination thereof.

4. The method of claim 1, wherein the node is a user equipment or a relay node.

5. The method of claim 1, wherein the node is a wireless network component.

6. The method of claim 1,
wherein the node is a relay node, further comprising:
sending, to a wireless network component, a request for paging resources;
receiving, from the wireless network component, an allocation of a set of paging resources including at least one paging resource in response to the request,
wherein the paging message is transmitted over the set of paging resources.

7. The method of claim 6,
wherein the request specifies at least one preferred signal synchronization block (SSB) index,
wherein the allocated set of paging resources comprises at least one SSB index, and
wherein the paging message is transmitted via the allocated at least one SSB index.

8. The method of claim 6,
wherein the request is sent via radio resource control (RRC) signaling, medium access control (MAC)-command element (CE) signaling, or uplink control information (UCI) signaling, and
wherein the allocation of the set of paging resources is received via RRC signaling, MAC-CE signaling, or downlink control information (DCI) signaling.

9. The method of claim 6, wherein the at least one reference value comprises a time value or a range of time values, location information, an event index value, or a combination thereof.

10. A method of wireless communication by a user equipment (UE), comprising:
receiving, from a node, a paging message including at least one reference value associated with an event that is detected as being in progress in a target geographical area;
determining to respond to the paging message based at least in part upon the presence at least one reference value within the paging message; and
transmitting a response to the paging message, the response comprising UE-identifying information and the at least one reference value.

11. The method of claim 10, wherein the determining determines to respond to the paging message based at least in part upon the presence at least one reference value within the paging message irrespective of whether the paging message includes information identifying the UE or information identifying a group to which the UE belongs.

12. The method of claim 10, wherein the node is another UE, a wireless network component, or a relay node.

13. The method of claim 10, wherein the at least one reference value comprises a time value or a range of time values, location information, an event index value, or a combination thereof.

14. A method of wireless communications by a user equipment (UE), comprising:
determining at least one reference value associated with an event; and
transmitting, from the UE to a wireless network component, at least one Message-A comprised by a Physical Uplink Shared Channel (PUSCH) of a 2-Step Random Access Channel (RACH) procedure, wherein the Message-A includes the at least one reference value associated with the event.

15. The method of claim 14, wherein the at least one reference value comprises a time value or a range of time values, location information, an event index value, or a combination thereof.

16. A method of wireless communications by a wireless network component, comprising:
receiving, from a user equipment (UE), at least one Message-A comprised by a Physical Uplink Shared Channel (PUSCH) of a 2-Step Random Access Channel (RACH) procedure, wherein the Message-A includes the at least one reference value associated with an event; and
performing at least one action related to the event based on the at least one reference value.

17. The method of claim 16, wherein the at least one reference value comprises a time value or a range of time values, location information, an event index value, or a combination thereof.

18. A method of wireless communication by a wireless network component, comprising:
receiving, from a relay node, a request for paging resources;
determining an allocation of a set of paging resources including at least one paging resource to the relay node in response to the request; and
transmitting an indication of the allocated set of paging resources to the relay node,
wherein the wireless network component is precluded from transmission of any paging messages on the allocated set of paging resources,
wherein the request specifies at least one preferred signal synchronization block (SSB) index,
wherein the allocated set of paging resources comprises at least one SSB index.

19. The method of claim 18,
wherein the request is received via radio resource control (RRC) signaling, medium access control (MAC)-command element (CE) signaling, or uplink control information (UCI) signaling, and
wherein the indication of the allocation of the set of paging resources is transmitted via RRC signaling, MAC-CE signaling, or downlink control information (DCI) signaling.

20. A node, comprising:
means for transmitting a paging message including at least one reference value associated with an event that is detected as being in progress in a target geographical area; and
means for receiving a set of responses to the paging message from a set of UEs including at least one UE, each response comprising UE-identifying information and the at least one reference value associated with the event.

21. A user equipment (UE), comprising:
means for receiving, from a node, a paging message including at least one reference value associated with an event that is detected as being in progress in a target geographical area;
means for determining to respond to the paging message based at least in part upon the presence at least one reference value within the paging message; and
means for transmitting a response to the paging message, the response comprising UE-identifying information and the at least one reference value.

22. A user equipment (UE), comprising:
means for determining at least one reference value associated with an event; and
means for transmitting, from the UE to a wireless network component, at least one Message-A comprised by a Physical Uplink Shared Channel (PUSCH) of a 2-Step Random Access Channel (RACH) procedure, wherein the Message-A includes the at least one reference value associated with the event.

23. A wireless network component, comprising:
means for receiving, from a user equipment (UE), at least one Message-A comprised by a Physical Uplink Shared Channel (PUSCH) of a 2-Step Random Access Channel (RACH) procedure, wherein the Message-A includes the at least one reference value associated with an event; and
means for performing at least one action related to the event based on the at least one reference value.

24. A wireless network component, comprising:
means for receiving, from a relay node, a request for paging resources;
means for determining an allocation of a set of paging resources including at least one paging resource to the relay node in response to the request; and
means for transmitting an indication of the allocated set of paging resources to the relay node,
wherein the wireless network component is precluded from transmission of any paging messages on the allocated set of paging resources,
wherein the request specifies at least one preferred signal synchronization block (SSB) index,
wherein the allocated set of paging resources comprises at least one SSB index.

25. A node, comprising:
a memory; and
at least one processor coupled to the memory and configured to:
transmit a paging message including at least one reference value associated with an event that is detected as being in progress in a target geographical area; and
receive a set of responses to the paging message from a set of UEs including at least one UE, each response comprising UE-identifying information and the at least one reference value associated with the event.

26. A user equipment (UE), comprising:
a memory; and
at least one processor coupled to the memory and configured to:
receive, from a node, a paging message including at least one reference value associated with an event that is detected as being in progress in a target geographical area;
determine to respond to the paging message based at least in part upon the presence at least one reference value within the paging message; and
transmit a response to the paging message, the response comprising UE-identifying information and the at least one reference value.

27. A user equipment (UE), comprising:
a memory; and
at least one processor coupled to the memory and configured to:
determine at least one reference value associated with an event; and
transmit, from the UE to a wireless network component, at least one Message-A comprised by a Physical Uplink Shared Channel (PUSCH) of a 2-Step Random Access Channel (RACH) procedure, wherein the Message-A includes the at least one reference value associated with the event.

28. A wireless network component, comprising:
a memory; and
at least one processor coupled to the memory and configured to:
receive, from a user equipment (UE), at least one Message-A comprised by a Physical Uplink Shared Channel (PUSCH) of a 2-Step Random Access Channel (RACH) procedure, wherein the Message-A includes the at least one reference value associated with an event; and
perform at least one action related to the event based on the at least one reference value.

29. A wireless network component, comprising:
a memory; and
at least one processor coupled to the memory and configured to:
receive, from a relay node, a request for paging resources;
determine an allocation of a set of paging resources including at least one paging resource to the relay node in response to the request; and
transmit an indication of the allocated set of paging resources to the relay node,
wherein the wireless network component is precluded from transmission of any paging messages on the allocated set of paging resources,
wherein the request specifies at least one preferred signal synchronization block (SSB) index,
wherein the allocated set of paging resources comprises at least one SSB index.

30. A non-transitory computer-readable medium containing instructions stored thereon, for causing at least one processor in a node to:
transmit a paging message including at least one reference value associated with an event that is detected as being in progress in a target geographical area; and
receive a set of responses to the paging message from a set of UEs including at least one UE, each response comprising UE-identifying information and the at least one reference value associated with the event.

31. A non-transitory computer-readable medium containing instructions stored thereon, for causing at least one processor in a user equipment (UE) to:
receive, from a node, a paging message including at least one reference value associated with an event that is detected as being in progress in a target geographical area;
determine to respond to the paging message based at least in part upon the presence at least one reference value within the paging message; and transmit a response to the paging message, the response comprising UE-identifying information and the at least one reference value.

32. A non-transitory computer-readable medium containing instructions stored thereon, for causing at least one processor in a user equipment (UE) to:
determine at least one reference value associated with an event; and
transmit, from the UE to a wireless network component, at least one Message-A comprised by a Physical Uplink Shared Channel (PUSCH) of a 2-Step Random Access Channel (RACH) procedure, wherein the Message-A includes the at least one reference value associated with the event.

33. A non-transitory computer-readable medium containing instructions stored thereon, for causing at least one processor in a wireless network component to:
receive, from a user equipment (UE), at least one Message-A comprised by a Physical Uplink Shared Channel (PUSCH) of a 2-Step Random Access Channel (RACH) procedure, wherein the Message-A includes the at least one reference value associated with an event; and
perform at least one action related to the event based on the at least one reference value.

34. A non-transitory computer-readable medium containing instructions stored thereon, for causing at least one processor in a wireless network component to:
receive, from a relay node, a request for paging resources;
determine an allocation of a set of paging resources including at least one paging resource to the relay node in response to the request; and
transmit an indication of the allocated set of paging resources to the relay node,
wherein the wireless network component is precluded from transmission of any paging messages on the allocated set of paging resources,
wherein the request specifies at least one preferred signal synchronization block (SSB) index,
wherein the allocated set of paging resources comprises at least one SSB index.

\* \* \* \* \*